(12) United States Patent
Cina et al.

(10) Patent No.: US 9,138,032 B1
(45) Date of Patent: Sep. 22, 2015

(54) MOLD-IN TOUCH FASTENER SYSTEMS WITH WAVE-SHAPED WALL

(71) Applicant: Velcro Industries B.V., Curacao (CW)

(72) Inventors: Michael Cina, Toronto (CA); Paul Joseph Voigt, Waterdown (CA); Denise Lane, Bedford, NH (US)

(73) Assignee: Velcro Industries B.V., Willemstad (CW)

( * ) Notice: Subject to any disclaimer, the term of this patent is extended or adjusted under 35 U.S.C. 154(b) by 0 days.

(21) Appl. No.: 14/697,838

(22) Filed: Apr. 28, 2015

(51) Int. Cl.
*A44B 18/00* (2006.01)
*B29C 39/02* (2006.01)
*B29L 31/00* (2006.01)

(52) U.S. Cl.
CPC ........... *A44B 18/0076* (2013.01); *B29C 39/026* (2013.01); *B29L 2031/729* (2013.01)

(58) Field of Classification Search
CPC ............... Y10T 428/24017; Y10T 428/24182; A44B 18/0076; A44B 18/00
USPC ................................................ 428/100, 120
See application file for complete search history.

(56) References Cited

U.S. PATENT DOCUMENTS

| | | |
|---|---|---|
| 3,408,705 A | 11/1968 | Kayser et al. |
| 4,775,310 A | 10/1988 | Fischer |
| 4,842,916 A | 6/1989 | Ogawa et al. |
| 5,058,245 A | 10/1991 | Saito |
| 5,061,540 A | 10/1991 | Cripps et al. |
| 5,067,210 A | 11/1991 | Keyaki |
| 5,342,569 A | 8/1994 | Murasaki |
| 5,500,268 A | 3/1996 | Billarant |
| 5,537,720 A | 7/1996 | Takizawa et al. |
| 5,606,781 A | 3/1997 | Provost et al. |
| 5,657,517 A | 8/1997 | Akeno et al. |
| 5,688,576 A | 11/1997 | Ohno et al. |
| 5,715,581 A | 2/1998 | Akeno |
| 5,725,928 A | 3/1998 | Kenney et al. |
| 5,766,723 A | 6/1998 | Oborny et al. |

(Continued)

FOREIGN PATENT DOCUMENTS

| | | |
|---|---|---|
| EP | 657118 B1 | 3/2000 |
| EP | 1452106 B1 | 12/2011 |

(Continued)

OTHER PUBLICATIONS

International Search Report and Written Opinion for PCT/IB2012/002941 mailed Jul. 8, 2013. 10 pages.

(Continued)

*Primary Examiner* — Alexander Thomas
(74) *Attorney, Agent, or Firm* — Finch & Maloney PLLC

(57) ABSTRACT

A touch fastener strip includes a pair of longitudinal barrier walls each extending upward from a base, a plurality of lateral barrier walls each extending upward from the base and between facing surfaces of the barrier walls, thereby defining one or more fastening cells, and a pair of wave walls each extending upward from the base and outboard the barrier walls thereby defining a relief space. Each wave wall has a wave shape having rising and falling edges, at least one of the edges having a slope in the range of 3° to 65°. In some cases, the wave shape has a duty cycle of 40% to 60%, and may include a sine wave, a triangle wave, a ramp wave, and/or a bi-modal wave having two different peak points in a given cycle of the shape. In one example application, the strip may be anchored in a foam cushion product.

30 Claims, 26 Drawing Sheets

(56) References Cited

U.S. PATENT DOCUMENTS

| | | |
|---|---|---|
| 6,463,635 B2 | 10/2002 | Murasaki |
| 6,656,563 B1 | 12/2003 | Leach et al. |
| 6,720,059 B2 | 4/2004 | Fujisawa et al. |
| 6,803,010 B2 | 10/2004 | Leach et al. |
| 6,896,759 B2 | 5/2005 | Fujisawa et al. |
| 7,022,394 B2 | 4/2006 | Fujisawa et al. |
| 7,608,070 B2 | 10/2009 | Chen et al. |
| 9,034,452 B2 | 5/2015 | Cina et al. |
| 2002/0164449 A1 | 11/2002 | Fujisawa et al. |
| 2002/0164451 A1 | 11/2002 | Fujisawa et al. |
| 2005/0160534 A1 | 7/2005 | Akeno et al. |
| 2007/0098953 A1 | 5/2007 | Stabelfeldt et al. |
| 2010/0181695 A1 | 7/2010 | Murasaki et al. |
| 2013/0149490 A1 | 6/2013 | Cina et al. |

FOREIGN PATENT DOCUMENTS

| | | |
|---|---|---|
| GB | 2468869 A | 9/2010 |
| WO | WO9625064 A2 | 8/1996 |
| WO | WO0189338 A2 | 11/2001 |

OTHER PUBLICATIONS

International Search Report and Written Opinion for PCT/EP2014/077568 mailed Feb. 19, 2015. 8 pages.

"Mold-In Touch Fastening Product", U.S. Appl. No. 14/565,764, filed Dec. 10, 2014. (Applicant will provide this unpublished Non-Provisional Application if requested by Examiner).

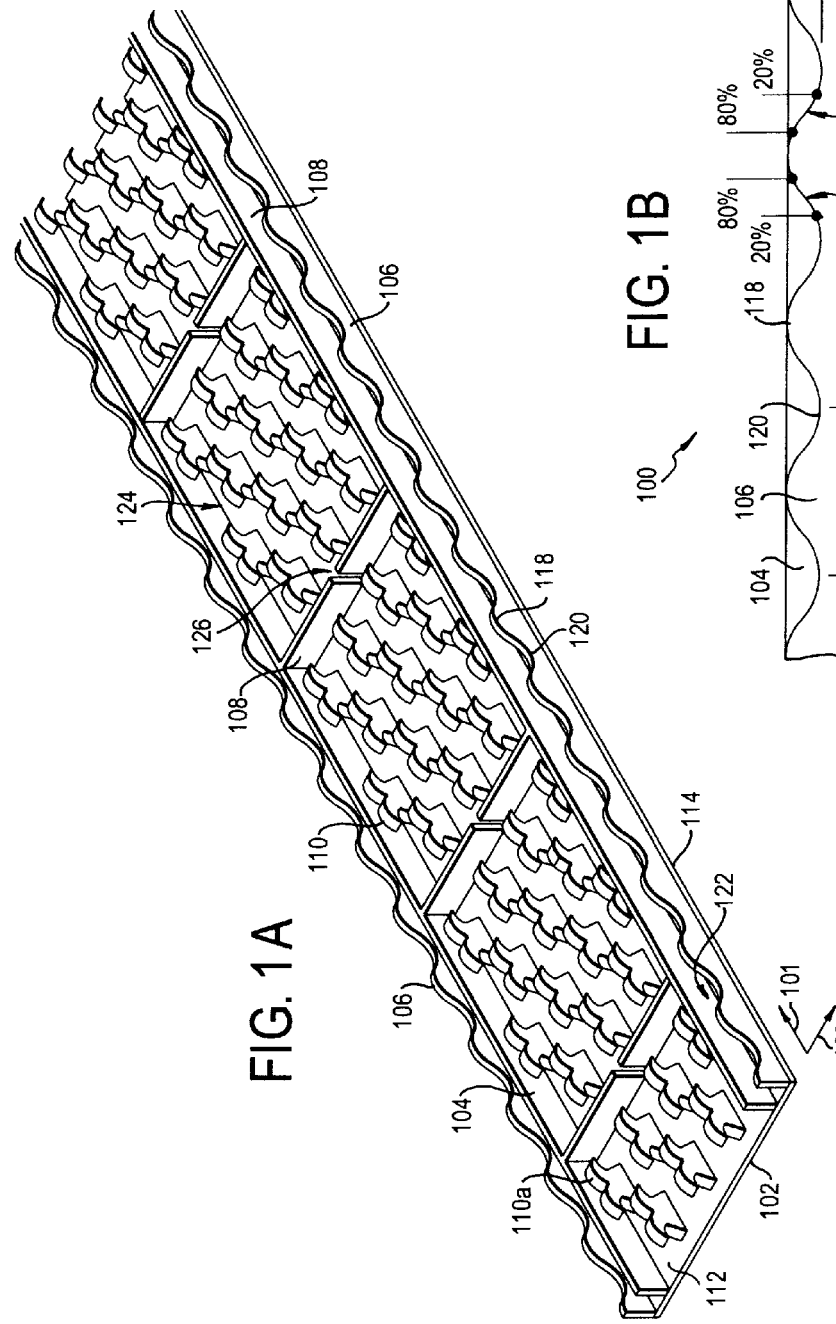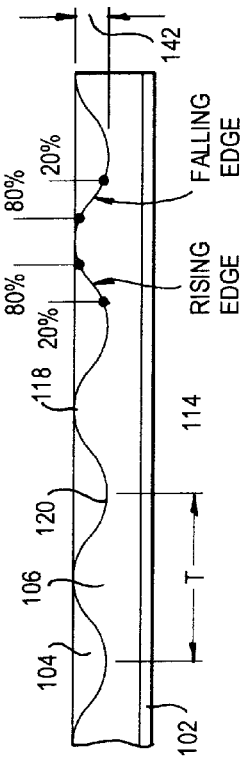

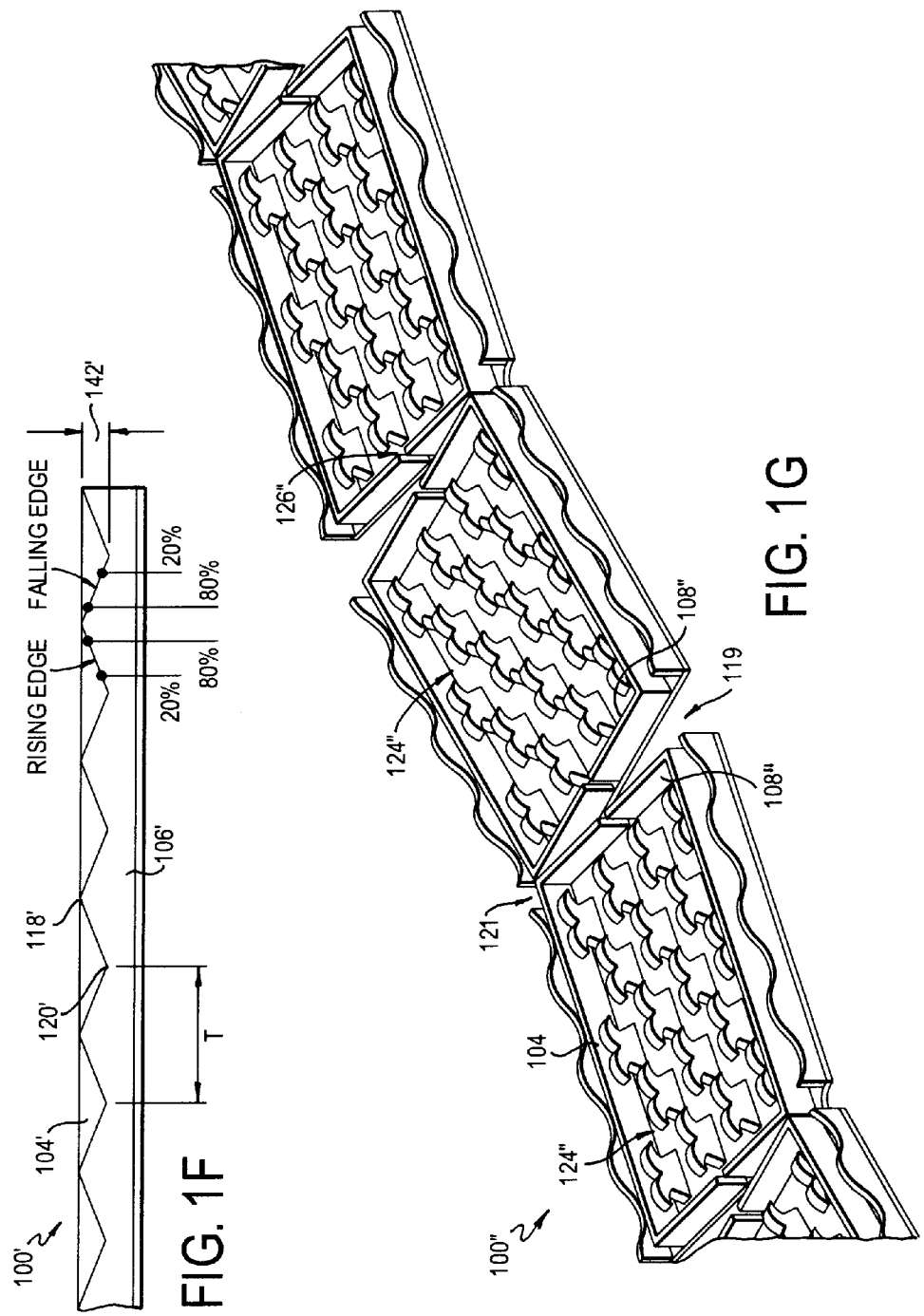

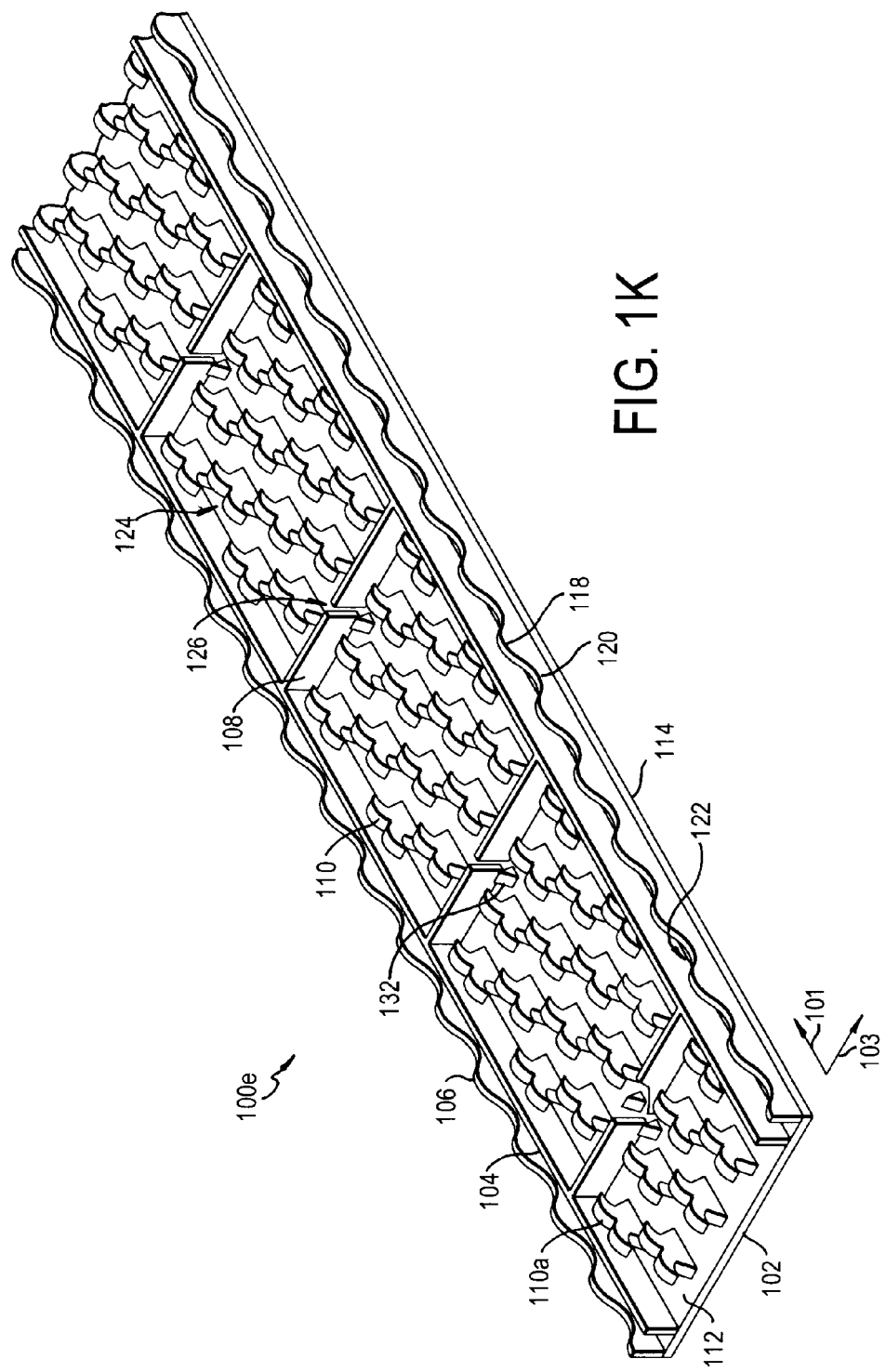

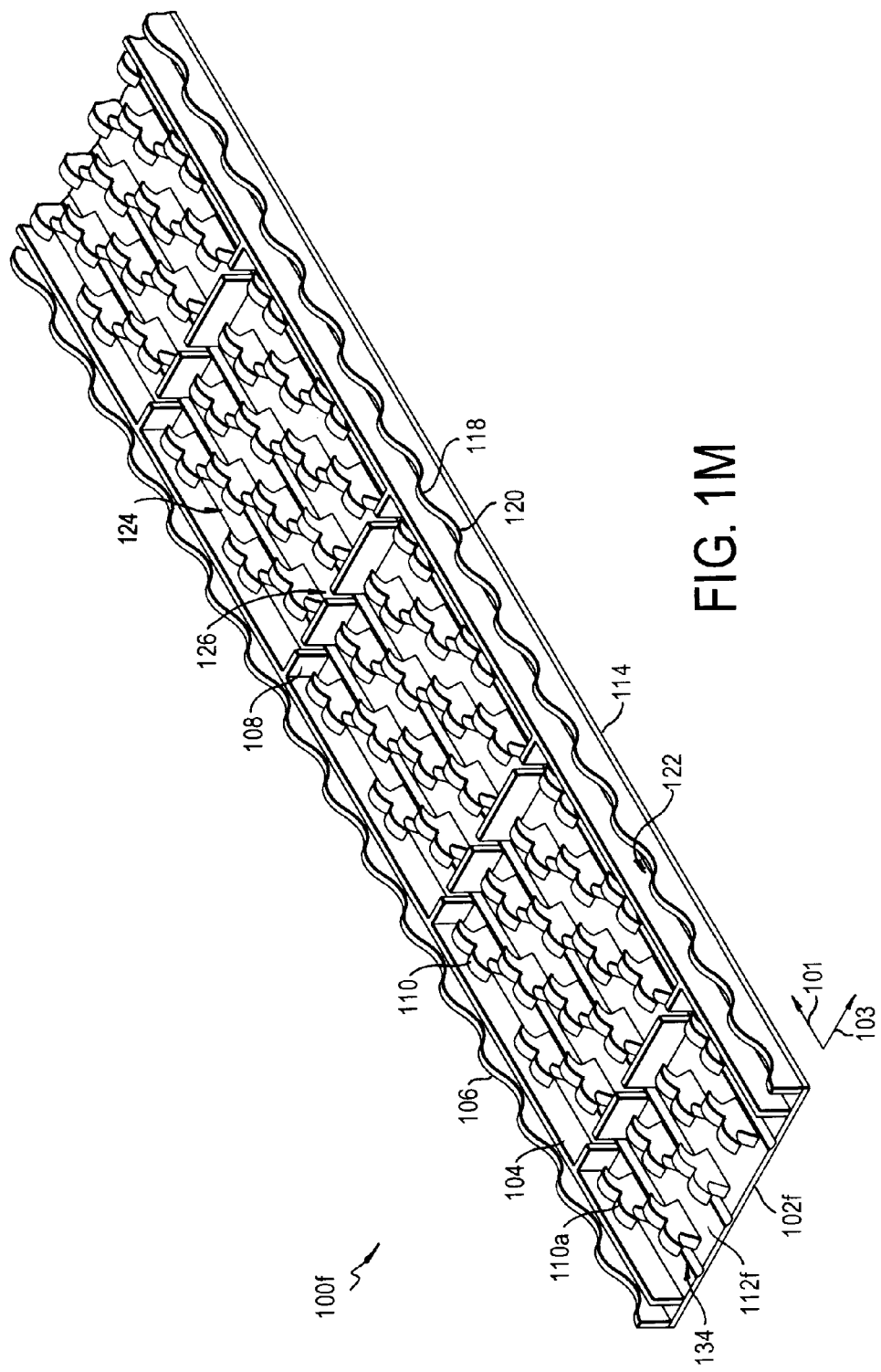

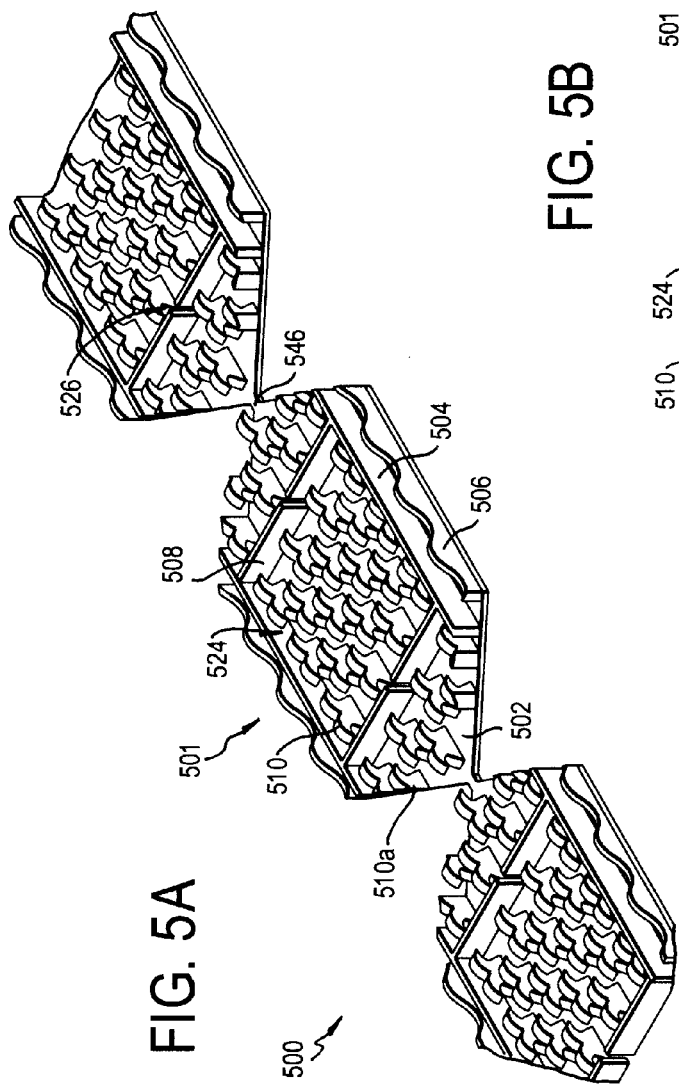
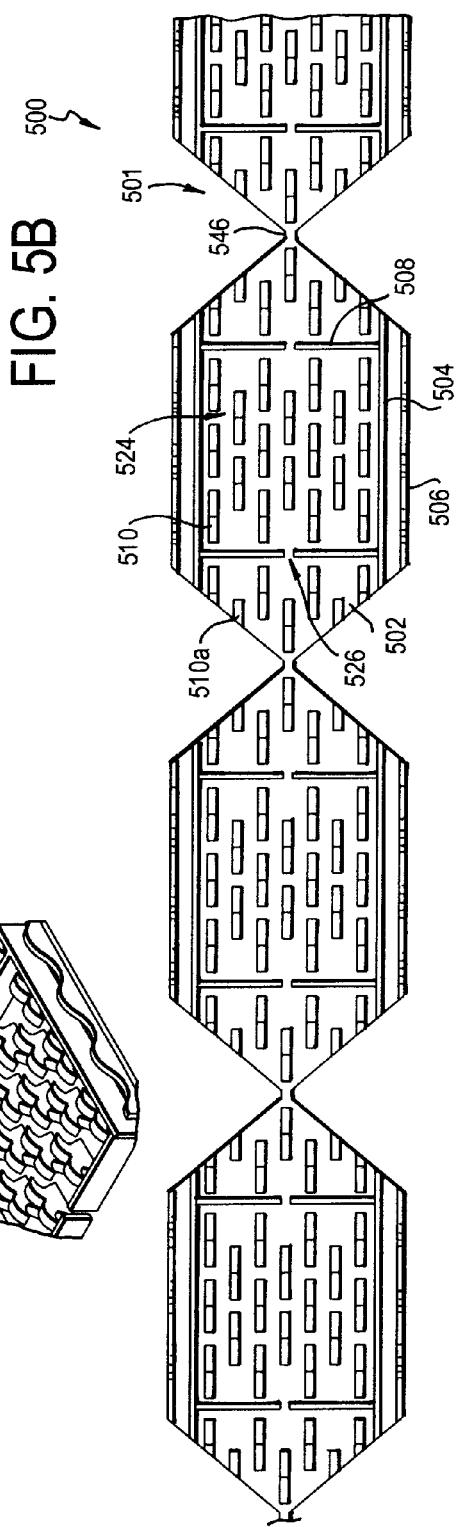
FIG. 5A
FIG. 5B

MOLD-IN TOUCH FASTENER SYSTEMS WITH WAVE-SHAPED WALL

FIELD OF THE DISCLOSURE

This disclosure relates to relates to touch fastening products, and more particularly to touch fastening products configured to be incorporated into molded articles.

BACKGROUND

Traditionally, hook-and-loop fasteners comprise two mating components that releasably engage with one another, thus allowing coupling and decoupling of the two surfaces or objects. The male fastener portion typically includes a substrate having fastener elements, such as hooks, extending from the substrate. Such fastener elements are referred to as "loop-engageable" in that they are configured to releasably engage with fibers of the mating component to form the hook-and loop-fastening. Among other things, hook-and-loop fasteners are employed to attach upholstery to car seat cushions. Such seat cushions are typically made of a foam material. To attach the upholstery to the foam, a male fastener product is incorporated at a surface of the foam car seat and the mating component is incorporated into or on the upholstery, or is provided by the upholstery itself. The male fastener elements releasably engage with the mating component to securely fasten the upholstery to the foam cushion. To incorporate a male fastener product into a foam cushion, the fastener product may be positioned within a cushion mold, such that as foam fills the mold to form the cushion, the foam adheres to the fastener product. Flooding of the fastener elements by the foam during forming of the cushion is generally seen as inhibiting the usefulness of the fastener elements. As such, features have been allocated to inhibit foam from flowing into the fastener areas.

BRIEF DESCRIPTION OF THE DRAWINGS

FIGS. 1A-1C are perspective, side, and top views, respectively, of a first fastening product configured in accordance with an embodiment of the present disclosure.

FIG. 1F is a side view of a first fastening product modified to have a different wave shape, according to an embodiment of the present disclosure. Additional example wave shapes are shown in FIGS. 14A-14F.

FIG. 1G is a perspective view of a first fastening product modified to accommodate lateral bending, according to an embodiment of the present disclosure.

FIGS. 1K and 1L are perspective and top views, respectively, of a first fastening product modified with disrupters adjacent gaps, according to an embodiment of the present disclosure.

FIGS. 1M and 1N are perspective and top views, respectively, of a first fastening product modified with longitudinal grooves, according to an embodiment of the present disclosure.

FIGS. 5A and 5B are perspective and top views, respectively, of a fifth fastening product, according to an embodiment of the present disclosure.

Like reference symbols in the various drawings indicate like elements. Note that the Figures are not necessarily drawn to scale. Further note that the wave shape may vary greatly from one embodiment to the next, and may have a more subtle or shallow rise and fall pattern, depending on the period and depth of the troughs. Numerous permutations will be apparent in light of this disclosure.

DETAILED DESCRIPTION

Figure 1C:
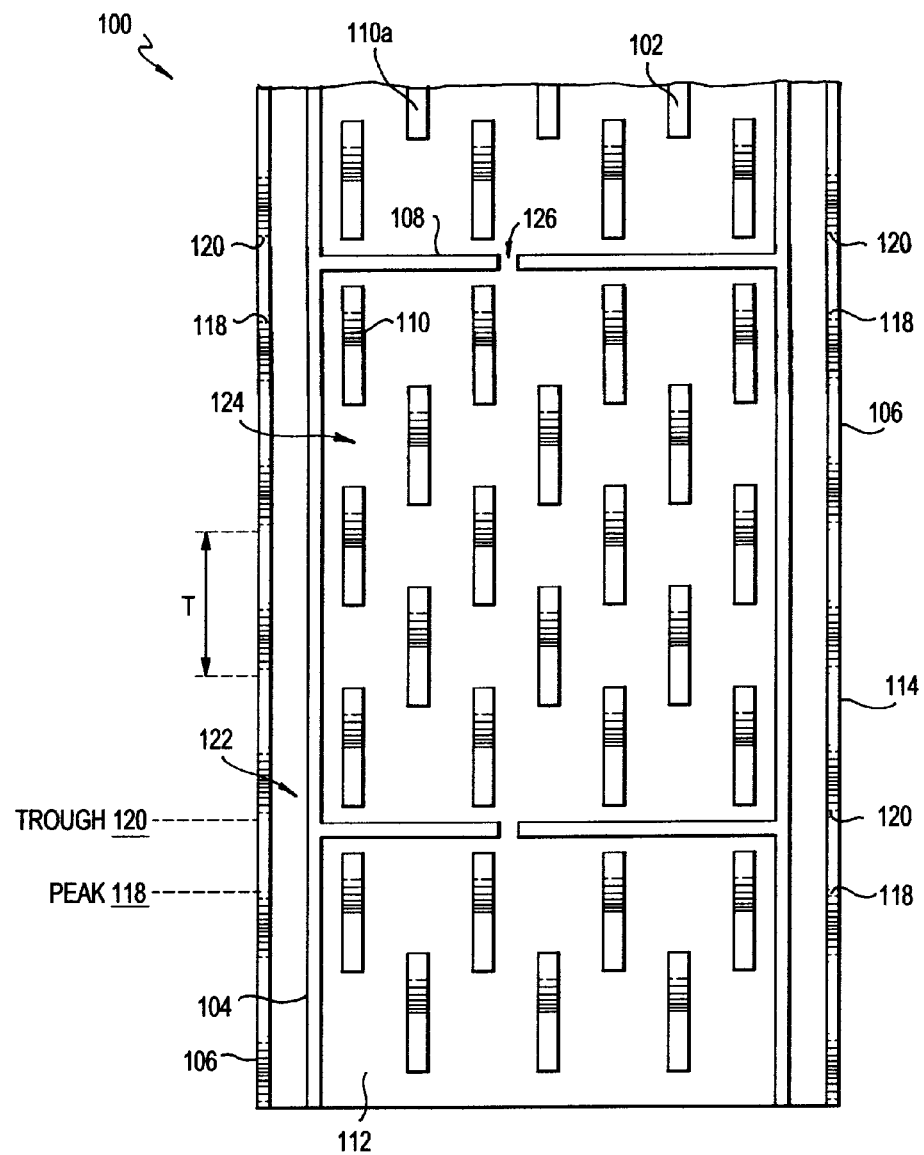

Referring to FIGS. 1A-1C, a fastening product 100 includes a substrate 102, barrier walls 104, wave walls 106, lateral walls 108, and fastener elements 110. Substrate 102 defines a longitudinal (i.e., lengthwise) direction 101, and a lateral (i.e., widthwise) direction 103 that is perpendicular to the longitudinal direction. In accordance with an embodiment, the substrate 102 is a flexible, elongated base sheet of molded resin, and each of barrier walls 104, wave walls 106, lateral walls 108, and fastener elements 110 extend integrally from an upper surface 112 of the substrate 102. A foam relief space 122 is defined between each barrier wall 104 and its corresponding wave wall 106, which effectively allows for anchoring the product 100 to a molded foam cushion. Each of the lateral walls 108 extends between facing surfaces of barrier walls 104 to define a longitudinal column of bounded fastening cells 124 containing one or more of the fastener elements 110. The wave wall 106 is a continuous wall configured with a wave shape that gradually rises and/or falls along the longitudinal direction 101 so as to provide one continuous element, rather than defining a plurality of discrete elements that rise and fall abruptly by virtue of substantially vertical edges. The wave shape defined by the wave wall 106 may be periodic (repetitive) as shown but need not be. In any case, when abutted against a mold pedestal used for forming foam cushions (or some other molded product), the wave shape provides one or more intentional openings or "flow gaps" that allow an appropriate amount of foam resin to flow into the foam relief space 122 during the manufacturing process, so that the fastening product 100 effectively becomes integrated with or otherwise anchored to the foam cushion being formed. Not wishing to be held to a particular theory, it is believed that the gradual rising and/or falling of the wave wall 106 allows the openings or flow gaps to be smaller than openings or flow gaps formed by discrete elements that rise and fall abruptly (substantially vertical rise and fall edges). In addition, the wave shape also allows the wave wall 106 to be both a single continuous element and flexible in the longitudinal direction, while maintaining rigidity in the lateral direction.

The wave shape of wall 106 can be, for example, sinusoidal, triangular, sawtooth (ramp), or any other shape that includes a gradual rising edge, or a gradual falling edge, or both gradual rising and falling edges, as compared to a discrete element having substantially vertical edges (e.g., 90 degrees, +/−5 degrees). To this end, the slope of the rising and/or falling edges of the wave wall can be set to provide an appropriate wave wall configuration, which generally includes non-vertical rising and/or falling edges. In some embodiments, such as the one shown in FIG. 1B for example, the slope of a straight line connecting the 20% and 80% points of a given waveform edge is in the range of about 3 degrees to about 65 degrees (assuming that 0 degrees is perfectly horizontal and 90 degrees is perfectly vertical, and further assuming that the 0% point is the lowest point along a given edge and the 100% point is the highest point along that edge). In still other embodiments, this slope can be in the range of about 3 degrees to about 60 degrees, or about 4 degrees to about 50 degrees, or about 5 degrees to about 40 degrees, or about 5 degrees to about 30 degrees, or about 5 degrees to about 20 degrees, or about 6 degrees to about 18 degrees. To this end, and as previously explained, the depth 142 and period T of the wave shape can vary greatly. Further note that the wave shape of wall 106 may be symmetrical, but need not be (e.g., rising edge can be steeper than the falling edge, or vice-versa). Further note that the wave shape of wall 106 may be repetitive the entire length of the product 100, but need not be (e.g., multiple wave shape types may be used along the length of wall 106). Numerous suitable wave wall 106 configurations can be used as will be apparent in light of this disclosure.

With further reference to the example embodiment of FIGS. 1A-C, barrier walls 104 are shown as continuous. In other embodiments, however, barrier walls 104 are discontinuous and can include a longitudinal column of spaced-apart wall segments defining longitudinal gaps therebetween (as will be described in turn). In the example shown, the fastener product 100 includes a pair of barrier walls 104 spanning the length of the substrate 102 in the longitudinal direction. Each of barrier walls 104 are positioned inboard of a respective longitudinal edge 114 of substrate 102.

When fastening product 100 is held against a flat surface, such as a surface of a mold pedestal (as will be discussed in turn), barrier walls 104 contact the mold pedestal surface to inhibit (if not prevent) flowing foam resin from infiltrating cells 124 and contacting fastening elements 110, in accordance with an embodiment. Accordingly, in such an example case, the height of barrier walls 104 is the same as that of fastener elements 110, while in still other such example cases the height of barrier walls 104 is greater than that of fastener elements 110. In some embodiments, however, barrier walls 104 can be slightly shorter than fastener elements 110 (e.g., 0.004 inches or less in height). In such embodiments, the barrier walls 104 may not contact the mold pedestal surface, but still provide a barrier against the ingress of foam into cells 124. For instance, in some such cases, a gap exists between the barrier walls 104 and the flat surface of the mold pedestal that is small enough to prevent or otherwise inhibit foam intrusion into cells 124. In still other such cases, the fastener elements 110 are configured to bend or compress when held by force against the mold pedestal, thereby bringing the barrier walls 104 in contact with the flat surface of the mold pedestal.

Each of wave walls 106 are disposed outboard of a respective barrier wall 104 (in lateral direction 103). In this example, wave walls 106 are positioned along respective longitudinal edges 114 of substrate 102. Other appropriate configurations, however, can also be implemented as will be appreciated in light of this disclosure. For example, wave walls 106 can be positioned substantially inboard of longitudinal edges 114, leaving hangover extensions of the substrate 102 outboard of walls 106. In this example, each of the two wave walls 106 extends integrally from upper surface 112 and runs parallel to barrier walls 104 down the entire length of substrate 102.

As further shown, each of wave walls 106 of this example embodiment includes a sinusoidal wave shape that includes symmetrical peaks 118 and troughs 120 so as resemble a sine wave signal having a period T and a 50% duty cycle. Note that as used here in, a 50% duty cycle refers to the two substantially equal halves that result if one cycle of the wave is divided by a horizontal line passing through the mid-point of the wave. Said differently, the area of the wave portion above the horizontal line is substantially equal to the area of the wave portion below the horizontal line. As explained herein, a precise 50% duty cycle is not required in such embodiments. For instance, the area of the wave portion above the horizontal line may be up to 20 percent greater than the area of the wave portion below the horizontal line. Alternatively, the area of the wave portion above the horizontal line may be up to 20 percent less than the area of the wave portion below the horizontal line. As further shown in this example embodiment, peaks 118 are the same height as the barrier wall 104, and the troughs 120 are a distance 142 from the barrier wall 104 top. As will be appreciated, the period T and distance 142 can vary from one embodiment to the next, and may be implemented in a relatively large macro scale (e.g., where features such as wall heights for 104 and 108 and lateral width of substrate 102 are measured in the order of 1 inch or more)

or a relatively small or micro scale (e.g., where features such as wall heights for 104 and 108 and lateral width of substrate 102 are measured in in fractional inches).

In some example cases, for instance, the period T ranges from about 0.05 to 0.2 inches (e.g., 0.09 to 0.16 inches), and distance 142 ranges from about 0.02 to 0.10 inches (e.g., 0.03 to 0.06 inches). Note that the depicted distance or depth 142 may vary from embodiment to embodiment, and is not drawn to scale or otherwise intended to limit the present disclosure to the specific configuration shown. Other embodiments may have a shallower depth 142, while others may have a deeper depth 142. For instance, troughs 120 may dip to just less than half the height of the wave wall 106 in some embodiments, although other trough 120 depths can be used, ranging from, for example, troughs 120 that dip to about the 50% point from the top of wave wall 106 or less, such as to the 50% point from the top of wave wall 106 or less, or the 40% point from the top of wave wall 106 or less, or the 30% point from the top of wave wall 106 or less, or the 20% point from the top of wave wall 106 or less. The minimum percentage of the wave wall that troughs 120 can dip from the top of the wall will depend on factors such as the fluidity of the foam and the desired fill pattern of the relief spaces 122. In some specific example cases, the ratio of depth 142 to the overall height of wave wall 106 is in the range 5% to 50%, or more specifically 5% to 45%, or even more specifically 5% to 40%, or even more specifically 8% to 35%. As will be appreciated, the depth 142 can be thought of as a peak-to-peak amplitude of the wave shape in wall 106, and sized to provide a desired flow gap. To this end, the ratio can be expressed as peak-to-peak amplitude divided by overall wave wall height (as measured from top most edge to the bottom of wave wall 106 at surface 112). Likewise, other wave shapes may have multiple different depths 142 along the direction 101. To give some further context with respect to size of product 100, according to some such example embodiments, the length of product 100 in the longitudinal direction 101 may be in the range of, for instance, 4 to 24 inches, and the width of product 100 in the lateral direction 103 may be in the range of, for instance, 0.4 to 2.0 inches. In addition, the height of a given product 100 so configured could be, for example, in the range of 0.06 to 0.4 inches (as measured from the underside of substrate 102 to the top of barrier wall 104), wherein the fastening elements have a similar height (as measured from the underside of substrate 102 to top of element 110).

As previously explained, the one or more openings formed by virtue of the rising and falling of the wave shape when product 100 is abutted with a mold surface allow a flowable material (e.g., a liquefied or partially expanded foam) to pass over (or under, as the case may be) the wave wall 106 and into the corresponding foam relief space 122. The opening(s) have an overall definable area which can be generalized as the missing portion(s) of wall 106 (if wall 106 where intended to be rectangular in shape rather than wave-shaped). In some embodiments, peaks 118 of wave wall 106 contact the mold surface, thereby defining a plurality of openings, while in other embodiments peaks 118 of wave wall 106 do not contact the mold surface, thereby defining a single continuous wave-shaped openings. In either case, the overall area defined by the one or more openings is in the range of, for example, about 4 to 45 percent of the wall 106 (if wall 106 was a whole rectangle shape, rather than wave-shaped), according to some embodiments. In still other embodiments, the overall area defined by the one or more openings is in the range of about 5 to 40 percent of the wall 106.

To this end, each of wave walls 106 defines an overall flow gap, formed from the one or more openings. An overall flow gap can be described as the total exposed area of all flow enabled openings of the wave wall 106. In this example, each of wave peaks 118 has a height equaling that of barrier walls 104. Accordingly, each opening is widest at the lowest point of trough 120 and gradually tapers in each direction until the neighboring peaks 118 are reached so as to effectively define a series of tapered flow gaps of each wave wall 106. Each of these tapered flow gaps contributes to the overall flow gap. In other embodiments, however, peaks 118 of wave wall 106 can be shorter than the barrier walls 104 so as to provide a single continuous tapered flow gap that gradually rises and falls, and to potentially augment the flow gap (depending on the distance between peaks 118 and the mold surface, as will be explained in turn).

The tapering of the flow gap(s) is believed to contribute to better resin flow management and control, because the area of tapered flow gap can actually be smaller than a non-tapered flow gap while still allowing a better distributed flow of foam into the relief space 122, thereby improving integration/anchoring of the product 100 into the foam cushion being formed. It may be helpful to measure the dimensions of the flow gap(s) in terms of area per unit strip length of substrate 102, although there are other ways to quantify and characterize the flow gap(s), such as by the slope of the rising and/or falling edges. A unit of strip length may be, for instance, equal to a period of 1T, 2T, 3T, or so on, such that the area per unit strip length of substrate 102 is a function of the wave period T. Other unit of strip values can be used. In any case, the dimensions of the flow gaps define the amount of foam that is allowed to pass through wave walls 106 during the molding process of a foam article. In some examples, and as previously explained, the flow gap(s) constitute between 5 percent and 40 percent of the effective area of the wave walls 106. By way of contrast, note that with a non-tapered flow control arrangement (substantially vertical rise and fall edges), the flow gaps constitute between 15 percent and 50 percent of the effective area of the non-tapered walls, based on comparison studies and evaluation. In general, it is believed to be more difficult to reliably control resin flow with a larger non-tapered flow gap area, so the reduction in flow gap area by way of gradual tapering is beneficial.

Foam passing through wave walls 106 enters foam relief spaces 122. The foam relief spaces 122 are delimited by a respective wave wall 106 and its nearest barrier wall 104. The dimension of a foam relief space 122 can be measured, for example, in terms of its volume per unit strip length of substrate 102. The volume per unit strip length can be defined as the product of the distance between facing surfaces of a respective wave wall 106 and its nearest barrier wall 104 and the height of the barrier wall 104. As will be appreciated in light of this disclosure, the fill pattern within the foam relief space 122 resulting from a tapered flow gap tends to be more evenly distributed than the fill pattern within the foam relief space 122 resulting from a non-tapered flow gap.

A number of benefits associated with foam relief space will be appreciated. For instance, allowing the foam to set-up around wall 106 and within relief space 122 (on each side of product 100) increases the bond strength between fastening product 100 and a foam molded article, such as a seat component for automobiles, trucks, trains, planes, and other such vehicle seats. Another benefit is that, in some cases, imperfections in a mold pedestal surface (e.g., scratches, dents, or uneven surfaces) can allow foam to flow past the barrier walls 104 and into contact with fastener elements 110. This can be inhibited (if not prevented), however, by permitting foam to enter and set-up in foam relief spaces 122. In some examples, the cured or solidified foam can form an integral seal with the mold tool surface, preventing flow past the barrier walls.

In some examples, the fastener product 100 is configured to achieve a particular ratio of foam relief space volume per unit strip length and flow gap area per unit strip length. This ratio is referred to herein as the foam relief ratio. To this end, the flow gaps and foam relief space can be appropriately dimensioned to provide an appropriate foam relief ratio. Providing a fastener product with an appropriate foam relief ratio allows the foam passing through the flow gaps of wave walls 106 to expand and set-up within the foam relief space 122, without exerting excessive force on fastening product 100. For example, when the foam relief ratio is too large, a deficient amount of foam enters the foam relief space. As a result, the solidified foam may not provide a strong anchor to the foam molded article. Conversely, when the foam relief ratio is too small, an excessive amount of foam enters the foam relief space. When the excessive amount of foam expands, a force is exerted on the fastening product (e.g., against substrate 102 and barrier walls 104). In some cases, the force may be sufficient to urge the fastening product 100 away from the mold pedestal surface, allowing foam to pass under the barrier walls 104. In some example embodiments, an appropriate foam relief ratio is between about 0.02 and 0.90 inches (continuing with the micro scale example configuration previously discussed). Foam relief ratios between about 0.30 and 0.65 inches or about 0.40 and 0.55 inches can also be implemented. As will be appreciated, a higher foam relief ratio can be achieved with a wave wall configuration as provided herein, given that the flow gap area can be smaller as well as the allowed flow patterns enabled by a flow gap having at least one gradually tapered edge.

Fastener elements 110 are flexible and extend upward from upper surface 112 of substrate 102. The fastener elements 110 are arranged in discrete fields or arrays separated by lateral walls 108. The fastener element configuration may vary from one embodiment to the next. For instance, in some example cases, each of fastener elements 110 has a head spaced above upper surface 112, and each head has two distal tips that extend in opposite directions to form hook-like overhangs (i.e., palm-tree type fastening elements). In such a configuration, the fastener elements 110 are configured to releasably engage fibers of a mating component (such as a seat covering fabric or loop field) to form a hook-and-loop fastening. Other appropriate types of fastening elements can also be used. For example, J-shaped hooks, mushroom-shaped hooks, one-way angled hooks, nail-head hooks, or any other fastening elements suitable to engage a mating component. Further note that the mating component need not be limited to loop or fabric, but can also employ hook-like fastening elements, so as to provide a hook-to-hook fastening interface.

In this example, lateral walls 108 laterally traverse an inner area between facing surfaces of respective barrier walls 104 to isolate arrays of fastener elements 110. In some implementations, however, the lateral walls 108 extend beyond the barrier walls 104, traversing the inner area between facing surfaces of the outer wave walls 106. Lateral walls 108, in conjunction with barrier walls 104 demarcate individual fastening cells 124. The fastener cells are effectively sealed against ingress of foam, when the fastening product 100 is held against a surface of a mold pedestal. In some embodiments, each lateral wall 108 defines one or more gaps extending therethrough and connecting adjacent fastening cells 124. For instance, in this example shown in FIGS. 1A-C, each lateral wall 108 defines one gap 126. The gaps 126 can extend from upper surface 112 of the substrate 102. The gaps 126 can also extend through an upper extent of the lateral walls 108. Other appropriate gap configurations, however, can also be implemented (as will be described in turn). In still other embodiments, there are fewer or no gaps 126. For instance, in one example embodiment, every other lateral wall 108 has no gap 126.

The gaps 126 each define a lateral width. An appropriate lateral width of the gaps 126 can be configured to provide certain desired properties of the fastening product 100. For instance, gaps 126 can be sized to simultaneously provide air-releasing capability, bending flexibility, resistance to foam intrusion, and retention. In some examples, the lateral gap width is between about 0.002 and 0.015 inches, or between about 0.004 and 0.012 inches. In one specific example case, the lateral gap width is about equal to a lateral width of a fastener element 110, which is sufficient to allow air-flow but not necessarily sufficient to allow flow of foam (depending on foam type and its flowability at dispensing time). In some implementations, the lateral width of gaps 126 is constant over different distances from upper surface 112. In some other implementations, the lateral width of the gaps 126 tapers or otherwise varies with distance from upper surface 112 (e.g., the gaps are wider at their distal extent than at a height closer to upper surface 112). In any such cases, providing a fastening product 100 with gaps 126 extending through lateral walls 108 separating fastening cells 124 can permit air to flow between the cells 124 during the mold-in process, and can in some cases help to avoid undesirable lifting of the fastening product 100 from the mold surface due to air expansion, and may equalize pressure between cells 124, helping to avoid 'burping' or rapid release of air from under the fastening product. Such gaps 126 can also increase the flexibility of the fastening product 100, permitting the fastening product 100 to more readily bend about an axis running along its length, or to otherwise conform to curved mold surfaces without buckling. Additionally, during the forming process, the foam may flow into fastener cells 124 adjacent ends of the product through the gaps, which may further help to anchor the ends of the fastening product in the molded foam article.

As shown in FIGS. 1A and 1C, the lateral walls 108 are disposed at predetermined intervals down the length of the substrate 102. In this manner, lateral walls 108 allow fastener product 100 to be manufactured in continuous spools that can be severed to form various lengths of fastening strips. In some examples, the inner surfaces of the lateral walls 108 are spaced apart from one another by between about 0.3 and 1.0 inches (e.g., about 0.5 inches in one specific example embodiment). In some examples, a continuous spool of the fastener product can be severed so as to leave a number of fastening elements 110a exposed to foam (as shown in FIG. 1A). The exposed fastening elements 110a can act as additional anchor points to the molded foam article. Further, as with barrier walls 104 and wave walls 106, lateral walls 108 can extend integrally from upper surface 112. The height of lateral walls 108 can be equal to that of barrier walls 104.

In a particular example embodiment, each of barrier walls 104, wave walls 106, and lateral walls 108 extend from upper surface 112 of substrate 102 to a height of 0.051 inches. Barrier walls 104 and wave walls 106 are provided having a thickness of 0.012 inches. Continuing with the example case, the distance between facing surfaces of barrier walls 104 is 0.364 inches, and the distance between lateral walls 108 is 0.450 inches. Such fastening cells 124 can, for example, accommodate an array of 18 fastener elements, although many other suitable fastener counts will be appreciated. Continuing with the example case, the period T of the sine wave formed in the wave wall 106 is 0.153 inches and distance 142 is 0.025 inches, such that neighboring wave wall peaks 118 are 0.153 inches from each other, as are neighboring troughs 120. In addition, troughs 120 dip to just less than half the height of the barrier wall 104 in this example embodiment, although other trough 120 depths can be used, ranging from, for example, troughs 120 that dip to about the 5% point from the top of barrier wall 104 to troughs 120 that dip to about the 50% point from the top of barrier wall 104. Thus, assuming a 50 duty cycle, the peak portions of the sine wave shape are 0.0765 inches at their widest point, as are the trough portions. Note that a precise 50% duty cycle is not needed; rather, the duty cycle can vary, for example, by 10% (i.e., 40% to 60% duty cycle), or 5% (i.e., 45% to 55% duty cycle), or 2% (i.e., 48% to 52% duty cycle). Continuing with the example case, the lateral width of foam relief spaces 122 (i.e., the distance between facing surfaces of a wave wall 106 and its nearest barrier wall 104) is 0.030 inches. In some examples, the combined width of the foam relief spaces 122 is between about 10 percent and 35 percent of the total lateral width of the substrate 102. As will be appreciated, the wider the foam relief space, the larger the anchor interface to the foam cushion.

Figure 1D:
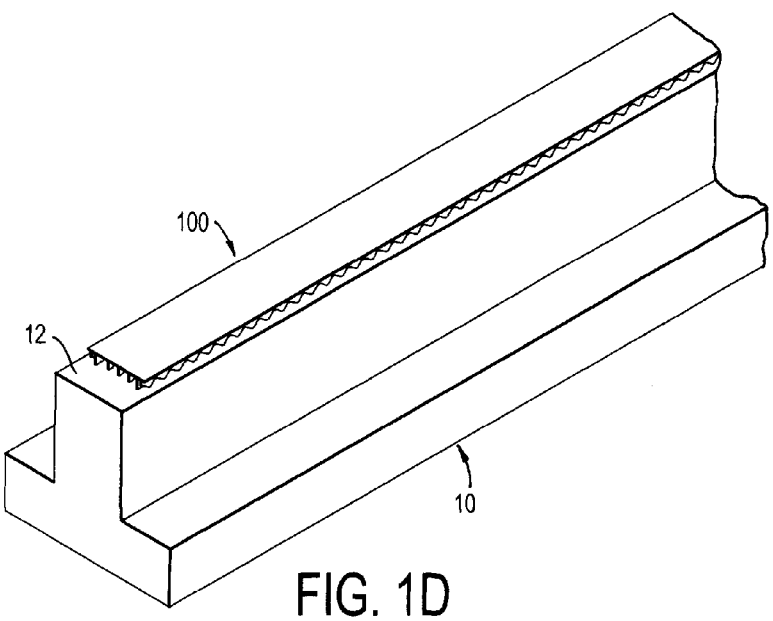
FIGS. 1D and 1E are perspective and side views, respectively, of the fastening product shown in FIGS. 1A-C, held against the surface of a mold pedestal, according to an embodiment of the present disclosure.
Figure 1E:
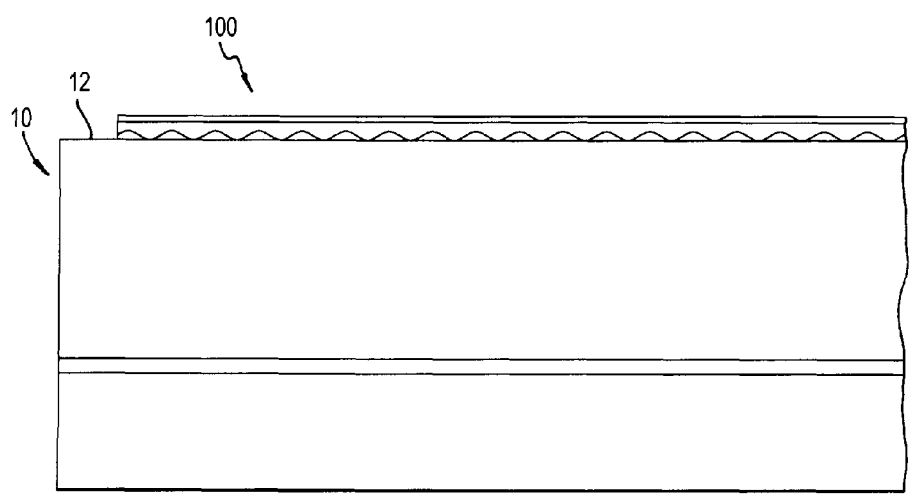

Turning to FIGS. 1D and 1E, fastener product 100 can be held against a mold pedestal 10. For example, one or more elements of fastener product 100 can be formed as a contiguous mass of magnetically attractable resin, such that the fastening product is attracted by a magnet to hold it against a flat mold pedestal surface 12. When fastener product 100 is held against mold pedestal 10, its barrier walls 104 and lateral walls 108 contact mold pedestal surface 12 such that flow of foam passed the barrier walls 104 and into contact with the fastener elements is inhibited (if not prevented). As explained herein, troughs 120 between neighboring wave wall peaks 118 provide a tapered flow gap allowing foam to enter appropriately dimensioned foam relief spaces in a desired fashion.

FIG. 1F shows a modified fastener product 100' according to another embodiment, where wave wall 106' is configured with a triangle wave shape having peaks 118' and troughs 120', and the troughs 120' are a distance 142' from the top of barrier wall 104'. This is one example alternative to the sine wave shape of wave wall 106 as shown in FIGS. 1A-1C. Although the edges of the triangle wave are straight rather than curved, it will be appreciated that they still provide a tapered flow gap that gradually rises and falls with the wave pattern. Note the period T of the wave pattern, as well as the 20% and 80% points of the rising and falling edges. Thus, similar benefits associated with the sine wave pattern substantially apply to the triangle wave pattern. Other previous discussion with respect to product 100 is equally applicable here.

FIG. 1G shows yet another modified fastener product 100" designed to provide lateral flexibility, in accordance with an embodiment. Fastener product 100" features a series of slits 119 formed between adjacent lateral walls 108" of each fastening cell 124", such that the lateral walls form direct barriers to foam flow when the product is placed in a mold with the slit opened as shown. In such cases, the gaps 126" are sized to permit only a limited amount of foam to intrude into each cell, so as to anchor the end of each cell in the foam while preventing the fouling of an excessive percentage of hooks within each cell. Slits 119 extend inward from one longitudinal edge of the base towards the opposing edge. In this example, slits 119 pass entirely through the barrier wall 104 near the opposing longitudinal edge of the base such that each fastening cell 124" is separated from any adjacent cell. As shown, each of slits 119 is paired with a small notch or slit 121 at the opposing edge (similar notch also shown in FIG. 1H). In one example case, the notches are formed as a semi-circular indentation formed in the base material. However, it is appreciated the notches might also have other designs (such as a slit) without departing from the scope of this disclosure. Together, notch 121 and slit 119 are formed about a hinge point in the base material to accommodate lateral bending. The slit and notch pairs can be oriented on either longitudinal edge of the fastener product. In some examples, the series of slit and notch pairs are formed in a specific pattern (e.g., X number of pairs that allow bending from the left followed by X number of pairs that allow bending from the right. and so on). In some examples, all of the slit and notch pairs are oriented on the same longitudinal edge. The fastener product 100" can be customized in this regard based on the desired flexibility performance.

Figure 1H:
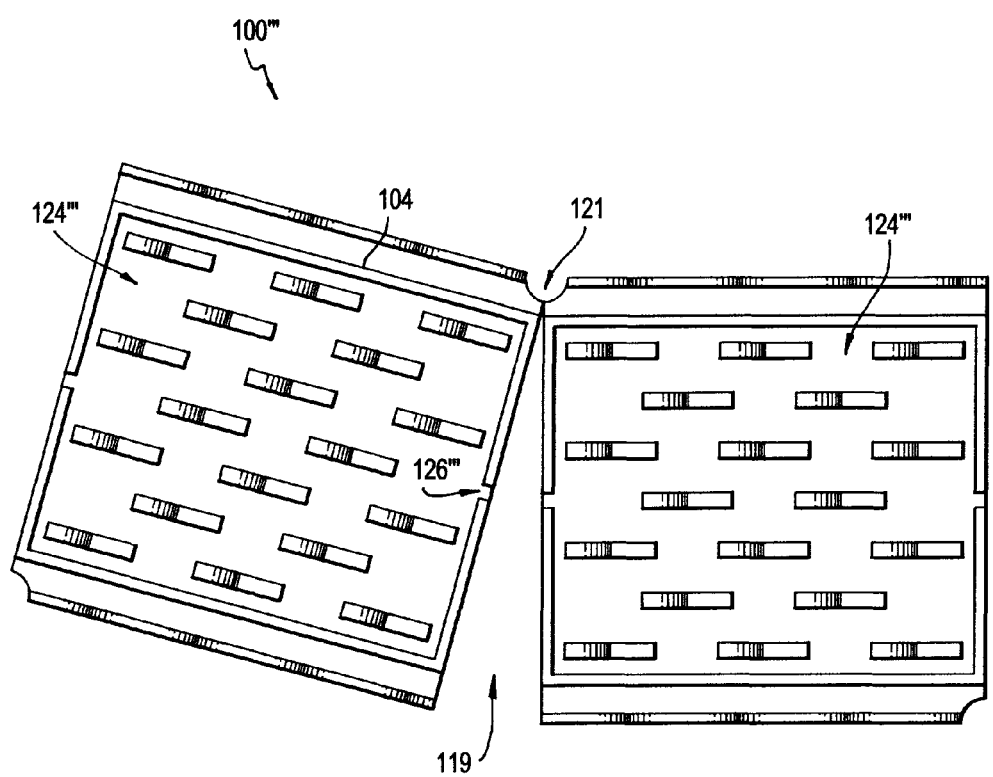
FIG. 1H is a top view of a first fastening product modified to accommodate lateral bending about a relatively strong hinge point, according to an embodiment of the present disclosure.

FIG. 1H shows still another modified fastener product 100'" designed to provide lateral flexibility, in accordance with an embodiment. Fastener product 100'" is similar to the previous example fastener product 100". However, in this case, slits 119 terminate at the barrier wall 104 near the opposing longitudinal edge of the base. Thus, in this example, adjacent fastening cells 124'" remain connected to one another by the opposing barrier wall 104. This design can provide a stronger hinge point, including both the base material and that of the walls rising upward from the broad surface of the base.

Figure 1J:
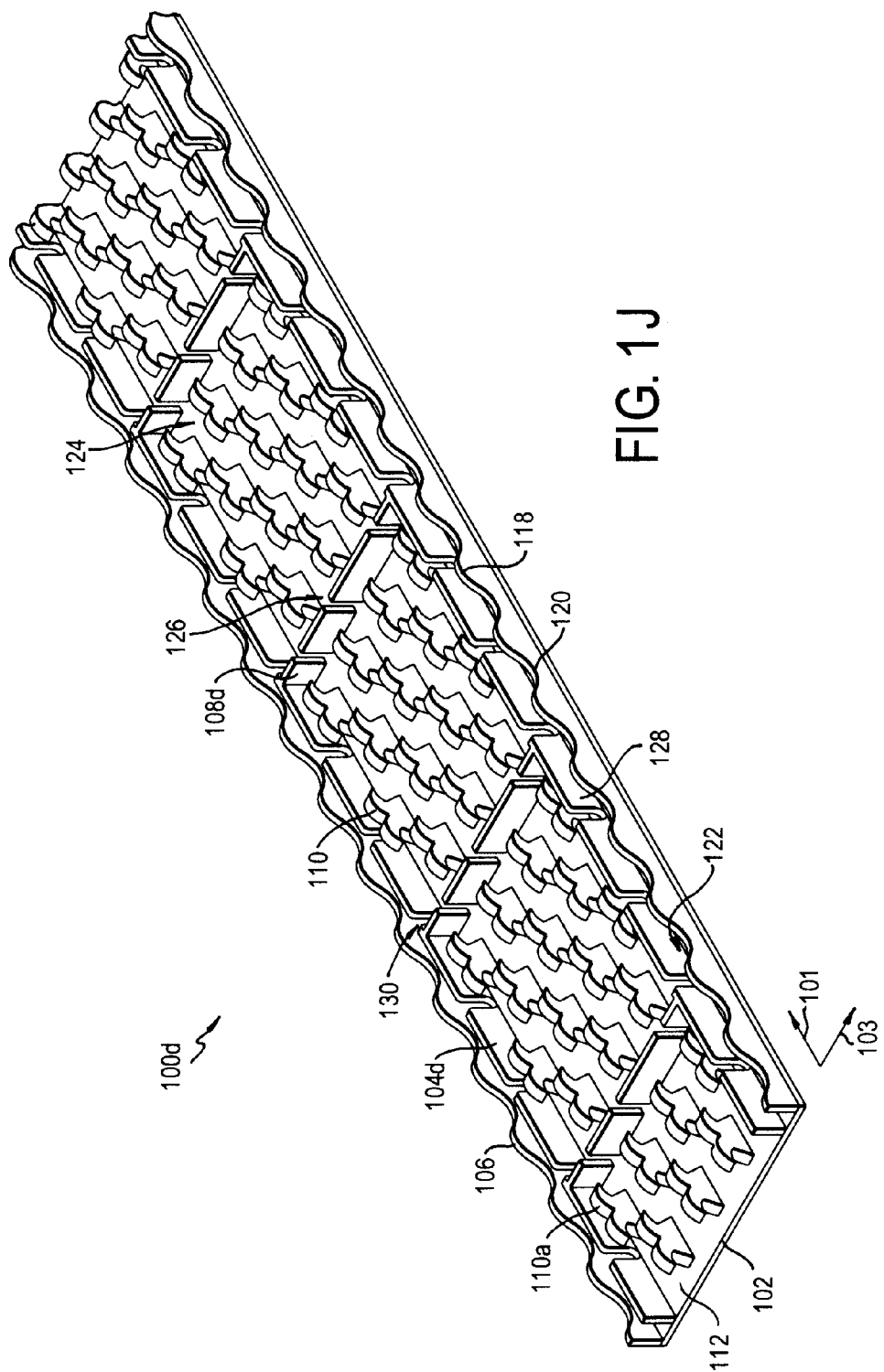
FIG. 1J is a perspective view of a first fastening product modified with longitudinal gaps along inner longitudinal barrier walls, according to an embodiment of the present disclosure.

FIG. 1J shows yet another modified fastener product 100d designed to provide longitudinal flexibility, in accordance with an embodiment. Fastener product 100d features discontinuous barrier walls 104d that each includes a longitudinal column of spaced-apart wall segments 128 defining longitudinal gaps 130 therebetween. The longitudinal gaps 130 of barrier walls 104d increase the longitudinal flexibility of the fastening product. Additionally, foam in foam relief spaces 122 may penetrate through the longitudinal gaps 130 and into fastener cells 124. In such cases, the longitudinal gaps 130 provide additional anchor points for holding the fastener product 100d to a molded foam article. However, a large amount of foam in the fastener cells 124 will tend to negate the fastening function of the fastening elements 110. Thus, an appropriate width of the longitudinal gaps 130 is selected to balance the properties of flexibility, retention and foam resistance. In a particular example, for instance, the maximum width of the longitudinal gaps 130 is about 0.02 inches or less. This width of the longitudinal gaps 130 may be larger, depending on factors such as the size of cells 124 and the initial flowability of the resin foam used and the desired degree of infiltration of foam into cells 124. In addition, the lateral walls 108d can define multiple gaps, as discussed herein. In this example, the lateral walls 108d each defines two gaps 126 therethrough.

Figure 1L:
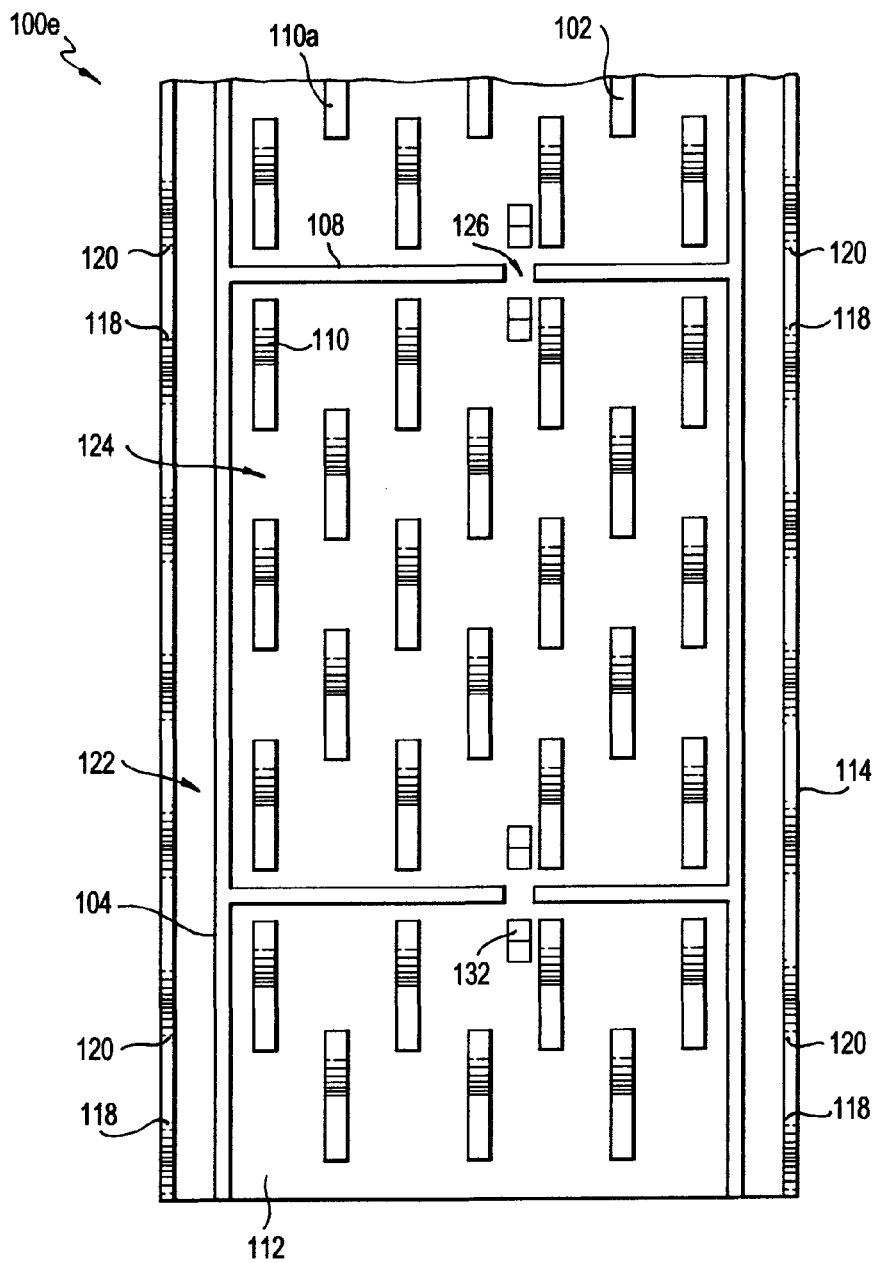

FIGS. 1K and 1L show perspective and top views of another modified fastening product designed to inhibit foam intrusion, in accordance with an embodiment. Fastener product 100e is similar to fastener product 100. However, in this case, fastener product 100e includes foam disrupters 132 adjacent gaps 126 that extend through lateral walls 108. The foam disrupters 132 extend from upper surface 112 of the substrate 102 and within fastening cells 124 adjacent gaps 126. The foam disrupters 132 are configured to disturb the structure of foam entering the fastener cells 124 through gaps 126. The foam disrupters 132 are also configured not to inhibit air releasing through gaps 126.

In some examples, the foam disrupters 132 have a height less than a height of the lateral walls 108, such as about a half of the height of the lateral walls 108. In some other cases, the disruptors extend to the same height as the lateral walls 108. In some examples, the foam disrupters 132 extend, in a side profile, to distal points. In one particular such example case, the distal points define a point radius of less than 0.0015 inches. Each gap 126 may have one or more adjacent foam disrupters. In the particular example depicted in FIG. 1K, a pair of spaced-apart foam disrupters 132 is adjacent each gap 126 in a straight-line sequence. Other configurations of the foam disrupters 132 can also be used to achieve similar benefits (flow inhibitor and air-release).

Figure 1N:
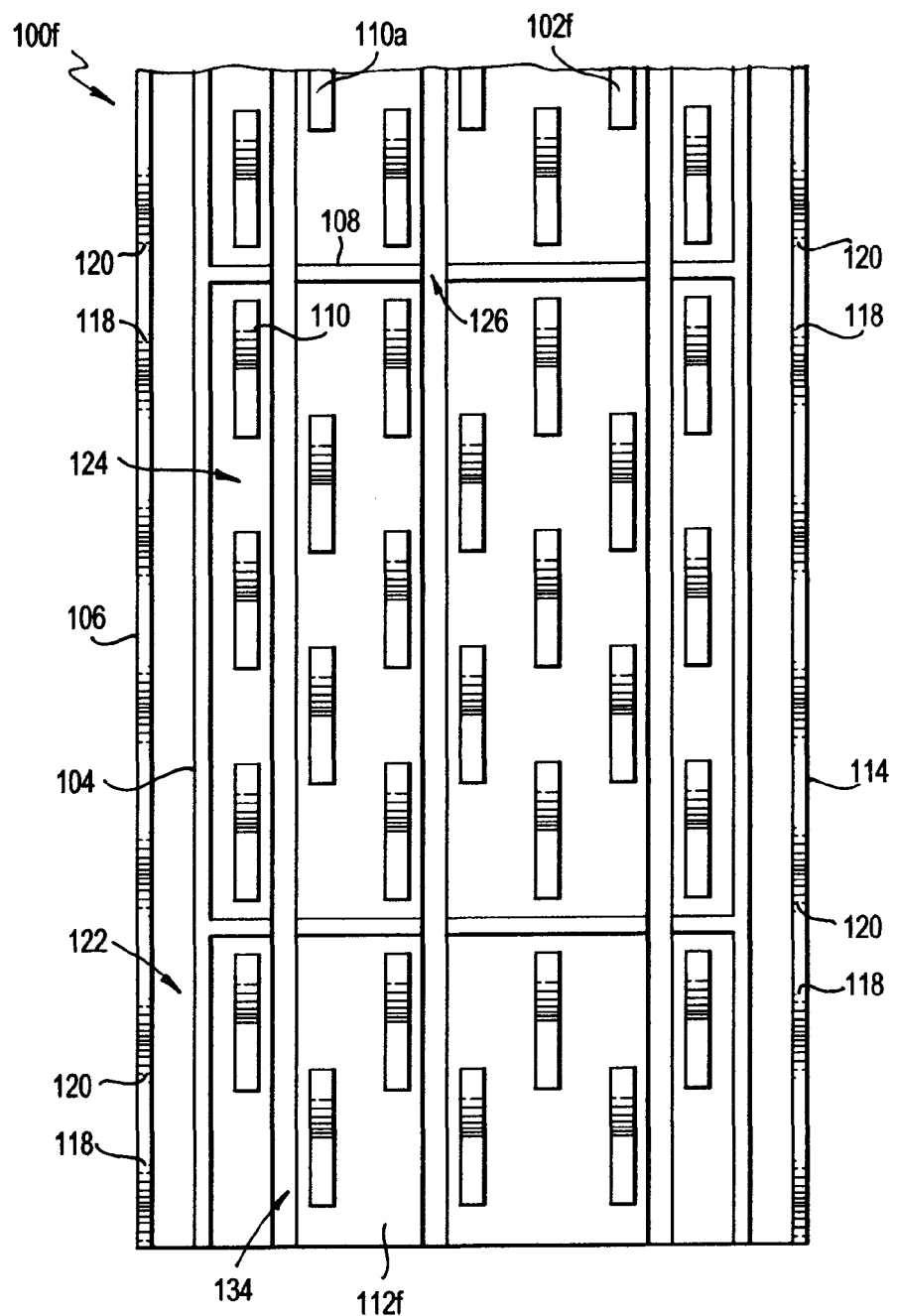

FIGS. 1M and 1N show perspective and top views of another fastener product designed to provide lateral flexibility, according to an embodiment. Fastener product 100*f* includes one or more longitudinal grooves 134 incorporated into the upper surface 112*f* of the substrate 102*f*. The longitudinal grooves 134 connect and form a lower extent of gaps 126 defined through lateral walls 108. In this example, grooves 134 are provided in the form of continuous indentations integrally molded with the substrate 102*f* and extend longitudinally along the length of the substrate 102*f*, substantially parallel to the longitudinal walls 104 and wave walls 106 of the fastening product. The substrate 102*f* can have a thickness in the grooves of less than about 70 percent of a nominal thickness of the substrate 102*f* on either side of the grooves 134. In some examples, the longitudinal grooves 134 are at most about 0.008 inches deep for a substrate 102*f* that has a nominal thickness of about 0.012 inches. Other implementations of the grooves 134 can also be used (e.g., perforations or folds in the substrate 102*f*).

Longitudinal grooves 134 allow an outer portion the fastener product 100*f* to flex relative to an inner portion. The degree of flexure is determined based on the material properties of the substrate 102*f* and the dimensions of the grooves 134. In some examples, the grooves 134 have a lateral width that is equal to a lateral width of the gaps 126 or a lateral width of the fastener elements 110. In a particular example, the grooves 134 are about 0.013 inches wide, and about 0.0065 inches deep. In some cases, the grooves 134 have sharp corners and flat bottoms, while in other cases the grooves have curved bottom surfaces and may form a portion of a cylinder.

Figure 1P:
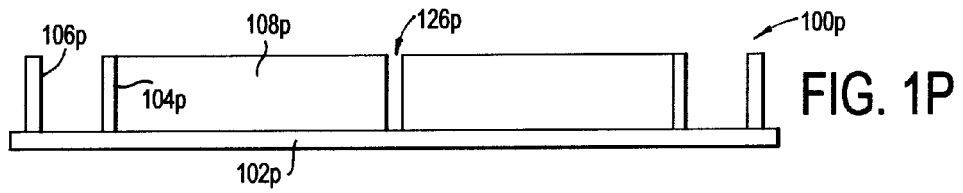
FIGS. 1P-1U each depict front views of a first fastening product modified with a different gap configuration within given lateral walls, according to an embodiment of the present disclosure.
Figure 1Q:
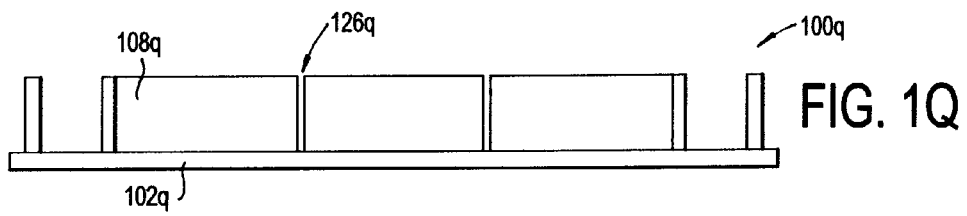
Figure 1R:
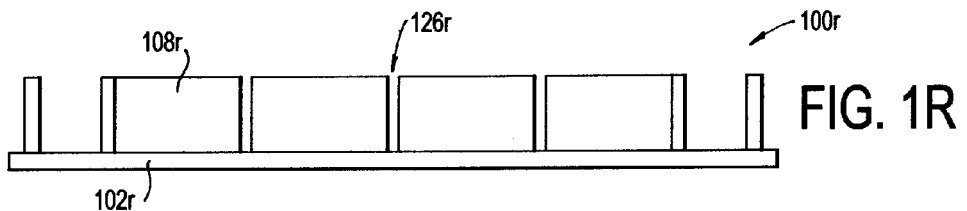
Figure 1S:
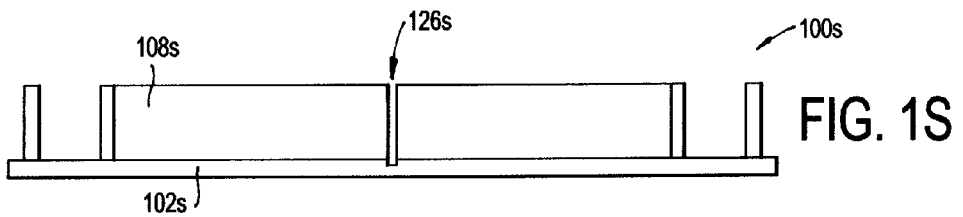

FIGS. 1P-1U show front views of fastener products with different gap 126 configurations. Fastener products 100*p*, 100*q*, 100*s*, 100*r*, 100*t*, and 100*u* each are similar to fastener product 100, however, lateral walls 108 of these fastener products define different gaps 126 extending therethrough. In some cases, a fastener product may include one or more features described in the different gap configurations. For fastener product 100*p*, as shown in FIG. 1P, each lateral wall 108*p* defines one gap 126*p*. The gap 126*p* can have a constant lateral width, extending from upper surface of the substrate 102*p* through an upper extent of the lateral wall 108*p*. In a particular example, the lateral width is about 0.012 inches. For fastener product 100*q*, each lateral wall 108*q* defines two gaps 126*q* therethrough that are spaced apart laterally. In a particular example, each gap 126*q* defines a lateral width of about 0.004 inches. Fastener product 100*r* features three spaced-apart gaps 126*r* extending through each lateral wall 108*r*. In a particular example, each gap 126*r* defines a lateral width of about 0.008 inches. In some implementations, gaps may extend into the substrate 102. For example, for fastener product 100*s*, lateral walls 108*s* extend from upper surface of the substrate 102*s*, while gap 126*s* extends from a position below the upper surface and within the substrate 102*s*. In a particular example, the substrate has a thickness of about 0.012 inches, and the gap 126*s* extends downwardly into the substrate about 0.005 inches.

Figure 1T:
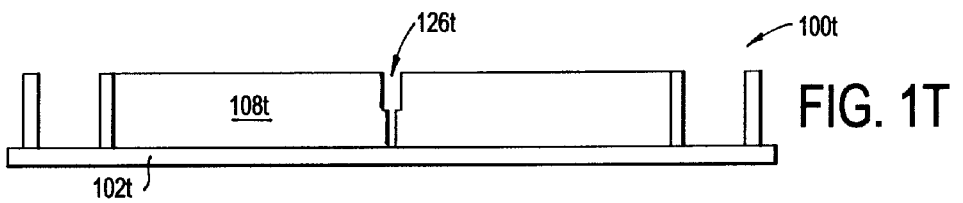
Figure 1U:
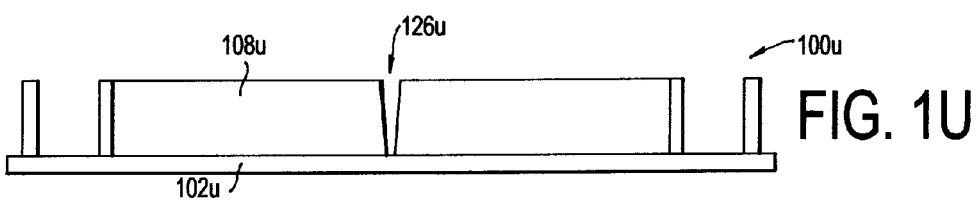

In some implementations, the gaps can be configured to vary with distance from upper surface of the substrate. For example, the gaps may be wider at their distal extent than at a height closer to upper surface of the substrate. As shown in FIG. 1T, gap 126*t* extends from upper surface of the substrate 102*t* to a middle position of the lateral wall 108*t* with a first lateral width, and then to the upper extent of the lateral wall 108*t* with a second lateral width that is wider than the first lateral width. In a particular example, the first and second lateral widths are 0.004 inches and 0.012 inches, respectively. As shown in FIG. 1U, gap 126*u* extends from upper surface of the substrate 102*u* to the upper extent of the lateral wall 108*u* with a tapered width that is narrowest near the substrate 102*t* and widest near the upper extent of wall 108*u*. In a particular example, the narrowest and widest widths are 0.004 inches and 0.012 inches, respectively. Such a tapered shape may allow for a more desirable flow pattern through the gap for anchoring.

Note that the transverse wall gaps in the various transverse walls of the product need not be laterally aligned. Laterally aligned gaps may be formed by molding about a common ring of a molding roll, but gaps in different transverse walls can be formed by different rings, such that the gaps of different transverse walls are differently spaced from a longitudinal edge of the product. Such purposeful misalignment may be useful, for example, in tailoring flexure resistance of the product along its length.

Figure 2A:
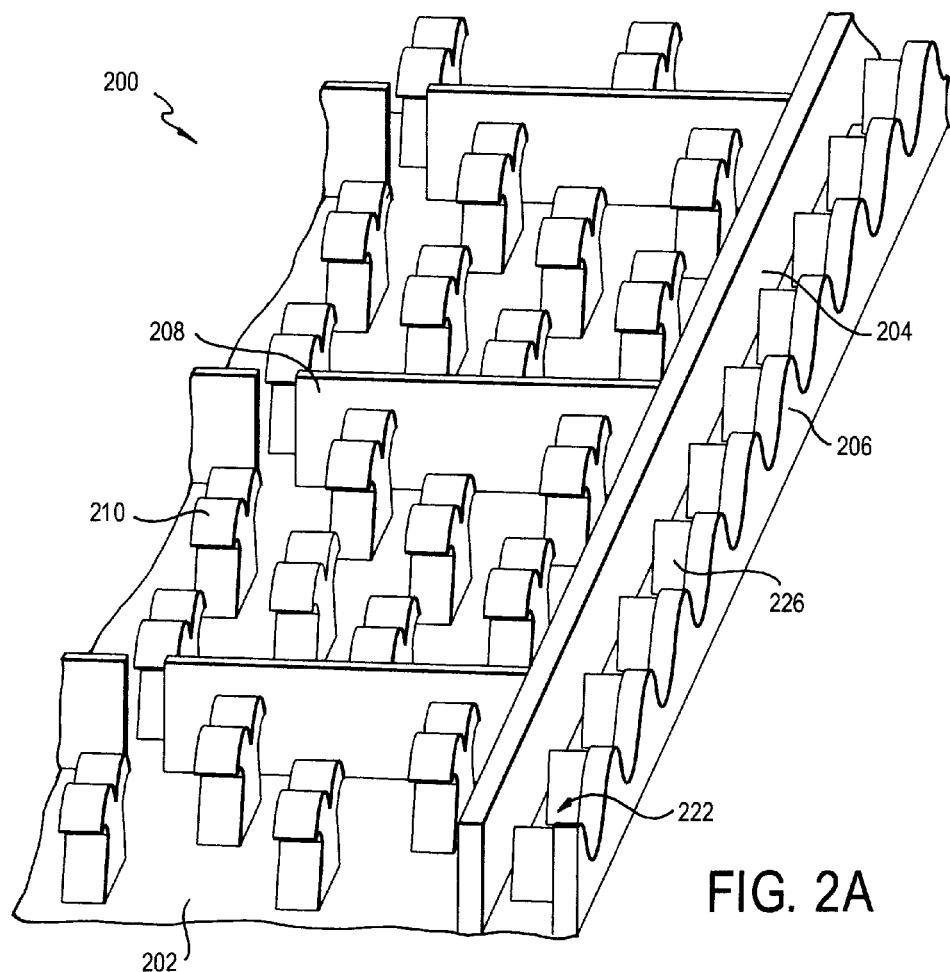
FIGS. 2A and 2B are perspective and side views, respectively, of a second fastening product, according to an embodiment of the present disclosure.
Figure 2B:
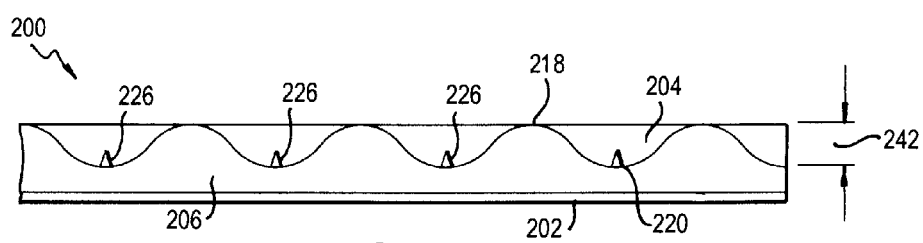

Referring to FIGS. 2A and 2B, another example fastener product 200 includes foam disrupters 226, in accordance with an embodiment. Fastener product 200 is similar in its configuration to fastener product 100. For example, fastener product 200 includes a substrate 202, barrier walls 204, wave walls 206, lateral walls 208, and fastener elements 210. Foam disrupters 226 are located within foam relief spaces 222. In this example, the foam disrupters 226 extend from the upper surface of substrate 202. In some other examples, however, foam disrupters can additionally, or alternatively, extend from facing surfaces of wave wall 206 and/or barrier wall 204. In such cases, note that the lateral-going disrupters (they generally extend in the lateral direction, rather than the up/down direction) offer an additional feature of anchor points, assuming foam reaches and covers the laterally disposed disrupters. As will be appreciated in light of this disclosure, the foam encroachment pattern into relief spaces 222 is believed to be better (more volume of the foam relief space 222, and possibly all, is filled with foam) when a wave pattern having gradually rising and/or falling edges is used to provide the flow gap, as variously provided herein.

As shown, foam disrupters 226 are arranged in a straight-line longitudinal sequence, such that each of the foam disrupters 226 is spaced apart from any neighboring foam disrupters 226 by a constant interval. Further, in this example, foam disrupters 226 are aligned with each of troughs 220. As such, the foam disrupters 226 can contact incoming foam before the foam sets-up (e.g., while the foam is still at least partially liquefied) and cannot be effectively disrupted. Other configurations of the foam disrupters 226 can also be used, however. For example, additional foam disrupters 226 that are not aligned with the troughs 220 can be provided. Further, in some implementations, the density of foam disrupters 226 per unit strip length of the substrate 202 varies. For instance, a first length of the substrate 20 can be provided with more or less foam disrupters 226 than a second length. In this example, the foam disrupters 226 are provided in the form of small molded spikes or barbs having the shape of a triangular prism. However, other types of foam disrupters 226 can also be used (e.g., upstanding stems or prongs). The height of the foam disrupters 226 is at most equal to that of the fastening elements, in some embodiments, but other embodiments may have taller or shorter foam disrupter 226 configurations.

Foam disrupters 226 are configured to disturb the structure of foam entering the foam relief spaces 222. For example, the foam disrupters 226 can collapse the foam by breaking foam bubbles. Collapsing foam entering foam relief spaces 222 increases the density of the foam (or reduces the porosity of the foam). As a result, the strength the foam is increased while its expansion ratio is decreased. Accordingly, providing an appropriate configuration of foam disrupters 226 allows the foam passing through the flow gaps of wave walls 206 to expand and set-up in foam relief spaces 222, without exerting excessive force on fastening product 200. As previously noted, in some cases, expansion of the foam can exert sufficient force to urge the fastening product away from the flat surface of a mold pedestal surface, allowing foam to enter into the interior of the fastening cells. Foam disrupters 226 can also serve as additional anchor points holding the fastener product 200 to a molded article when the foam cures or sets up in the foam relief spaces 222.

In a particular example, each of the foam disrupters 226 extends from the upper surface of the substrate to a height of 0.012 inches, and widthwise (i.e., in the lateral direction of the substrate) to 0.006 inches. The foam disrupters 226 are disposed within the foam relief spaces at a constant longitudinal distance interval of about 0.154 inches so as to centrally align with troughs 220 (this assumes, for example, that the sine wave has a 50% duty cycle and the period T equals 0.154). Further assume barrier wall 204 and peaks 218 extend from upper surface of substrate 202 to a height of 0.051 inches, and distance 242 is 0.025 inches down from peak 218 (which corresponds to the lowest point of troughs 220. Other implementations of the foam disrupters can also be used. For example, the foam disrupters can be provided in the form of a surface roughness (e.g., foam disrupters with a height between about 1 and 100 nanometers) applied to one or more of the walls delimiting the foam relief spaces 222. In some examples, the foam disrupters are placed at random within the foam relief spaces 222, such that no discernable pattern or sequence is achieved. In some examples, the foam disrupters 226 can have various appropriate sizes and shapes.

Figure 3:
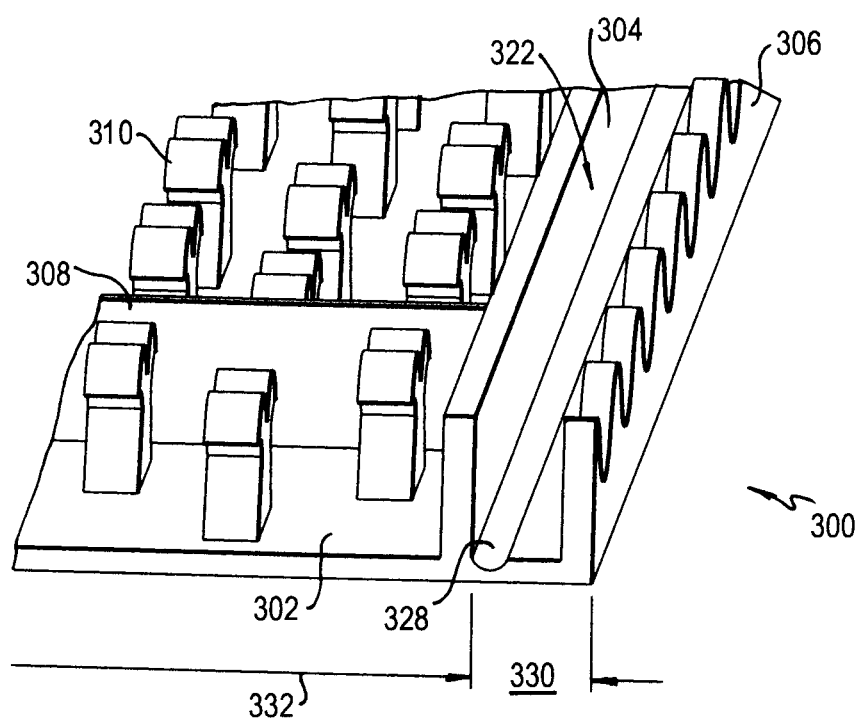
FIG. 3 is a perspective view of a third fastening product, according to an embodiment of the present disclosure.

Referring to FIG. 3, another example fastener product 300 includes hinges 328, in accordance with an embodiment. Fastener product 300 is similar in its configuration to fastener product 100. For example, fastener product 300 includes a substrate 302, barrier walls 304, wave walls 306, lateral walls 308, and fastener elements 310. Hinges 328 are incorporated into the upper surface of substrate 302 within foam relief spaces 322. In this example, hinges 328 are provided in the form of continuous indentations integrally molded with the substrate 302 and positioned just outboard of barrier walls 304. In some examples, the hinges are at most about 0.008 inches deep inches, assuming a substrate that has a nominal thickness of about 0.012 inches. Other implementations of the hinges can also be used (e.g., perforations or folds in the substrate).

Hinges 328 can allow outer portions 330 (e.g., the portions of the fastener product outboard of the hinges) of the fastener product to flex relative to an inner portion 332. The degree of flexure is determined based on the material properties of the base substrate and the dimensions of the hinges. In a particular example, the hinges are 0.013 inches wide, and about 0.0065 inches deep for a substrate 302 that has a nominal thickness of about 0.012 inches. Allowing the outer edge portions to flex relative to the inner portion of the fastener can reduce stress near the longitudinal edges of the substrate 302. These stresses can result from various operations in forming the molded foam article. For example, in molding the article, stress is imparted on the fastening product near its longitudinal edges when foam expands in the foam relief spaces. High stress also occurs during other common processes such as de-molding and roller crushing. When the fastener product is secured to the molded product, hinges 328 allow the outer portions to move with the cured foam. As a result, crack formation and propagation near the longitudinal edges is inhibited.

As shown, hinges 328 extend longitudinally along the length of the substrate 302, substantially parallel to the barrier walls and wave walls of the fastening product. However, in some examples, the fastening product can include lateral hinges that traverse the width of the fastener product. The lateral hinges can be incorporated, for example, into the backside surface of the substrate 302, and disposed at predetermined intervals down the length of the substrate. Incorporating lateral hinges into the fastening product can increase flexibility in the longitudinal direction, such that the fastening product is more suited for winding about a take-up roll and forming a continuous spool.

Figure 4A:
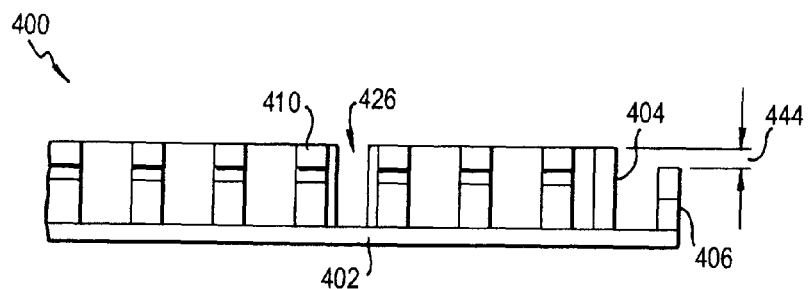
FIGS. 4A-4C are front, side, and perspective views, respectively, of a fourth fastening product, according to an embodiment of the present disclosure.
Figure 4B:
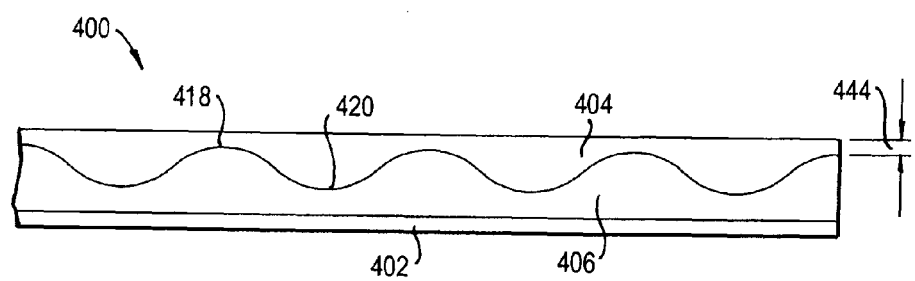
Figure 4C:
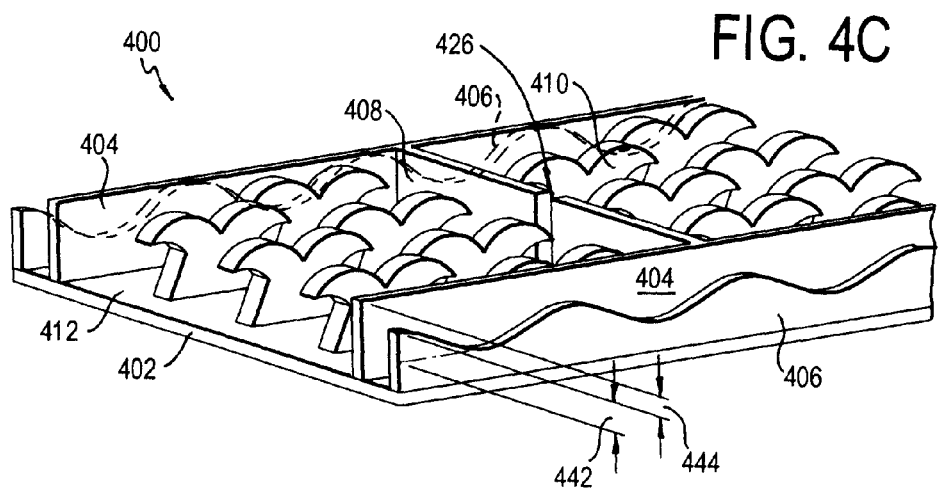

Referring to FIGS. 4A-4C, another example fastener product 400 has an augmented flow gap, according to an embodiment. Fastener product 400 is similar in its configuration to fastener product 100. For example, fastener product 400 includes a substrate 402, barrier walls 404, wave walls 406, lateral walls 408, and fastener elements 410. Lateral walls 408 each define a gap 426 therethrough. In this example, peaks 418 of wave wall 406 extend from the upper surface of substrate 402 to a height that is significantly lesser than that of barrier walls 404. For example, in some such embodiments, the height of the wave wall peaks 418 are at least 0.004 inches shorter than the barrier wall 404 top edge. In a particular example, the difference in height between wave wall peaks 418 and the barrier wall height is about 0.011 inches. As shown, the height difference provides additional flow openings 444 for foam to enter the foam relief spaces. Accordingly, the flow gap of each wave wall 406 generally includes the open area provided by both flow openings 444 and troughs 420. The troughs 420 have a depth 442 from the peak 418. Although, in the illustrated examples, each of the wall peaks 418 are the same height, as are the troughs 420, other implementations where different sections of the wave pattern have different heights (for example, some wall peaks 418 will be taller or shorter than other wall peaks 418 along that wall 406, and/or some troughs 420 may be lower than other troughs 420 along that wall 406). As will be further appreciated in light of this disclosure, wave walls having other wave shapes can be used, and such short wall configurations are not limited to the sine wave.

Referring to FIGS. 5A-5B, another example fastener product 500 includes a chain of multiple fastening segments 501, in accordance with an embodiment. Each of the fastening segments includes a substrate 502, barrier walls 504, wave walls 506, lateral walls 508, and fastener elements 510 and 510a. Each lateral wall 508 defines at least one gap 526 therethrough. Fastener segments 501 are connected to one another by a flexible neck 546. More particularly, in this example embodiment, the flexible neck connects the base substrates of neighboring fastener segments to one another. As shown, the width of the flexible neck is less than the width of each segment. In some examples, the flexible neck can be flexible around three orthogonal axes. Accordingly, the flexible neck 546 can allow connected fastening units to move relative to one another.

As shown, the barrier walls 504 and lateral walls 508 of each segment 501 define a fastener cell 524 which seals fastener elements 510 from contact with foam material during a molding process. Fastener elements 510a, which are disposed outside of fastener cells 524, remain exposed during the molding process. As such, when fastener product 500 is held against a mold pedestal, flowing foam is allowed to contact and surround fastener elements 510a, but not fastener members 510. Therefore, fastener elements 510a can act as anchor points for securing fastener product 500 to a molded foam article, while fastener elements 510 remain available for engagement to a mating fastening component. Additionally, flowing foam may pass through gaps 526 and into fastener cells 524. In this case, the gaps 526 can be configured to be small enough such that only a small amount of foam passes into fastener cells but is inhibited from contacting fastener elements 510. With solidified foam, the gaps 526 can act as additional anchor points for better holding fastener product 500 to the molded foam article. In some examples, the barrier walls 504 and wave walls 506 of each fastening segment 501 provide foam relief spaces that are appropriately dimensioned based on a foam relief ratio (as previously described), or to otherwise achieve suitable anchoring.

Any other details provided herein can also be used in conjunction with the embodiments of FIGS. 5A-B, or any other embodiments for that matter, and numerous permutations and variations will be apparent in light of this disclosure. For instance, in some examples, each of the fastening segments 501 includes multiple foam disrupters positioned proximate to gaps 526 or within the foam relief spaces (as previously described with reference to FIGS. 1K-L and 2A-B, respectively). The foam disrupters can be configured to disturb the structure of foam entering the next cell 524 or foam relief spaces. Likewise, each of the fastening segments 501 may include hinges positioned in the foam relief spaces (as described with reference to FIG. 3) that allow outer portions of the fastener product to flex relative to an inner portion.

As with any of the example embodiments provided herein, suitable anchoring may be achieved, for instance, as a result of a sufficient percentage of the foam relief space volume being filled with foam. In some embodiments, for example, the ingress of foam into the foam relief spaces via the flow gap(s) of wave wall 506 fills at least 30 percent of the volume of the foam relief spaces, or at least 50 percent of the volume of the foam relief spaces, wherein in-bound foam streams flowing into the foam relief space through neighboring troughs of wave wall 506 meet each other somewhere behind the intervening wave wall peak. In still other embodiments, the flow gap(s) provisioned allow 75 percent or more of the volume of the foam relief spaces to be filled with foam. In some cases, up to 100 percent of the volume of the relief spaces is filled with foam. Further recall how lateral-going disruptors or other protruding features extending laterally within the foam relief space from one or both of the facing walls of a barrier-wave wall pair actually serve as anchor points when they are covered with foam that sets around them.

Applications and Manufacturing of Fastening Product

As will be further appreciated, the fastening products described herein may be used in a variety of fastening applications. For example, in addition to conventional foam molding applications, the arrangements of the fastening elements and walls can also be employed on a rigid fastening surface, such as injection molded fastening products. The following description provides details of an example application of a fastening product having the types of configurations discussed herein.

Figure 6A:
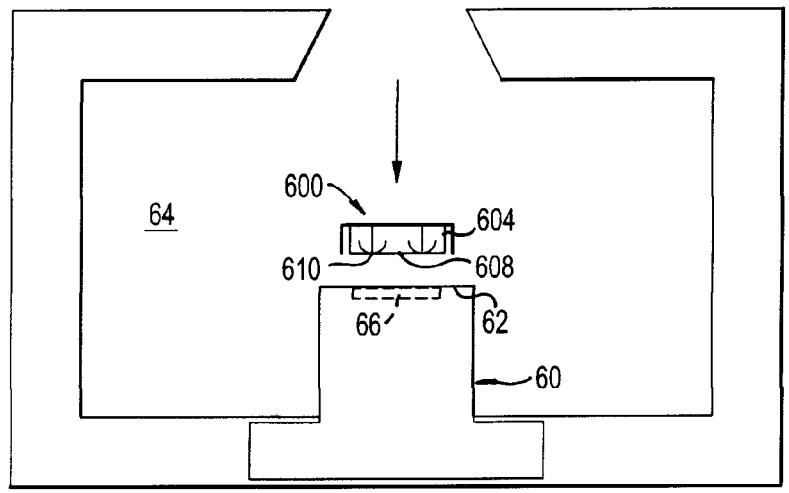
FIGS. 6A-6D schematically and sequentially illustrate a process for forming a molded foam article with a fastening product embedded in one surface of the article, according to an embodiment of the present disclosure.

As shown in FIG. 6A, fastener product 600 is placed on a flat surface 62 of a mold pedestal 60. Mold pedestal 60 is disposed in the interior space of a mold cavity 64. Fastener elements 610 of the product face the mold pedestal surface.

Figure 6B:
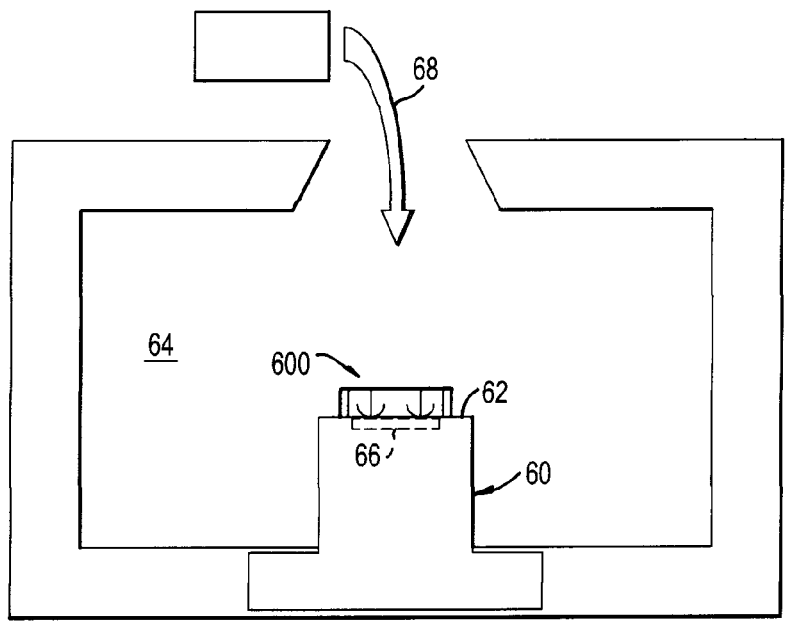
Figure 6C:
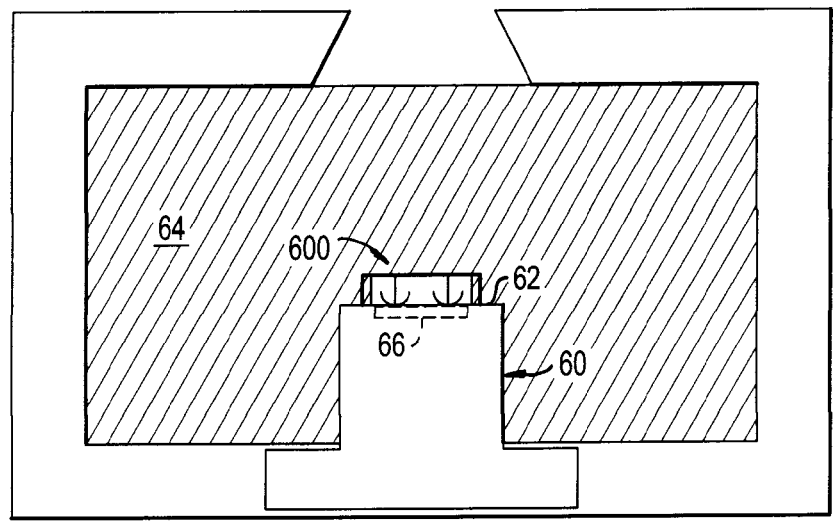

As previously described, the fastener elements 610 are arranged on the surface of the supporting substrate in arrays bounded by the walls of neighboring fastener cells (i.e., the barrier walls 604 and lateral walls 608). As shown in FIG. 6B, fastener product 600 is held against flat surface 62 by an embedded magnet 66 that attracts the fastener product. Magnetic attraction may be due to magnetically attractable resin forming all or part of the fastener product, or may be due to some other magnetically attractable material (e.g., a metal shim or mesh that is secured to or embedded in the substrate of the product). Alternatively, or in addition, a vacuum could also be used to hold the fastener product to the mold surface 62 (e.g., a vacuum could be pulled at the pedestal surface 62, via a set of apertures in the area designated as 66, the apertures in communication with a vacuum source). With further reference to FIG. 6B, liquid foam resin 68 is introduced into the mold cavity 64. Liquid foam 68 may constitute a single component, or there may be multiple components that are mixed as they are introduced into the mold cavity, or before. In some implementations, polymeric foams (e.g., polyurethane foam, latex foam, and the like) are used. The foam may be selected based on the intended application (e.g., automobile seat cushions, airplane seat cushions, etc). As shown in FIG. 6C, the liquid foam expands to fill the mold cavity 64. In some examples, the mold cavity 64 can include a number of vents to allow gas displaced by the expanding foam to exit the mold cavity, as is generally known in the molding industry.

As the liquid foam fills the mold cavity, the foam is allowed to pass through the one or more openings or flow gaps associated with the wave walls outboard of the barrier walls 604 and enter appropriately dimensioned foam relief spaces. The foam relief spaces allow the foam to expand without forcing the fastener product away from the mold pedestal surface. In some cases, a limited amount of foam also flows into the gaps within the lateral walls bordering fastening cells near the ends of the products. The tops of the walls of the fastening cells rest against the flat pedestal surface, effectively preventing excessive fouling of the fastening elements 610.

Figure 6D:
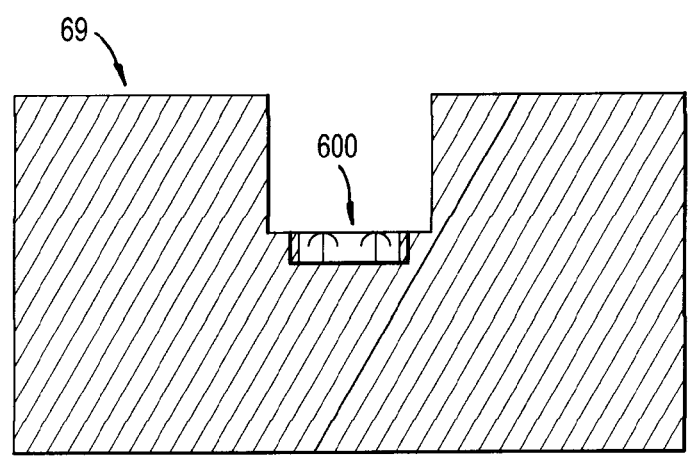

Referring to FIG. 6D, a molded foam article 69, as removed from the mold cavity, has fastening product 600 embedded in a trench defined by the mold pedestal. The perimeter of the fastener product is surrounded by foam in this example configuration. Foam also occupies the foam relief spaces, anchoring fastening product 600 to the foam article 69. The barrier walls and lateral walls of the fastening product form flow barriers to inhibit, if not prevent, foam from contacting the interior fastening elements. As a result, the fastener elements remain exposed and functional to releasably engage with fibers of a mating component (not shown) to form a hook-and-loop fastening, or to engage with hooks of a mating component (not shown) to form a hook-to-hook fastening, or a combination such hook-and-loop and hook-to-hook fastenings in some example cases.

Other appropriate molding techniques and apparatus can be used to form a molded article with an incorporated fastener product. For instance, in some examples, the fastening product can be placed directly on a surface of the mold (e.g., in a trench of the mold, or otherwise positioned within a mold so as to provide an operatively accessible fastener product that can then interface with a suitable mating component), as opposed to the mold pedestal surface shown and described herein.

Figure 7:
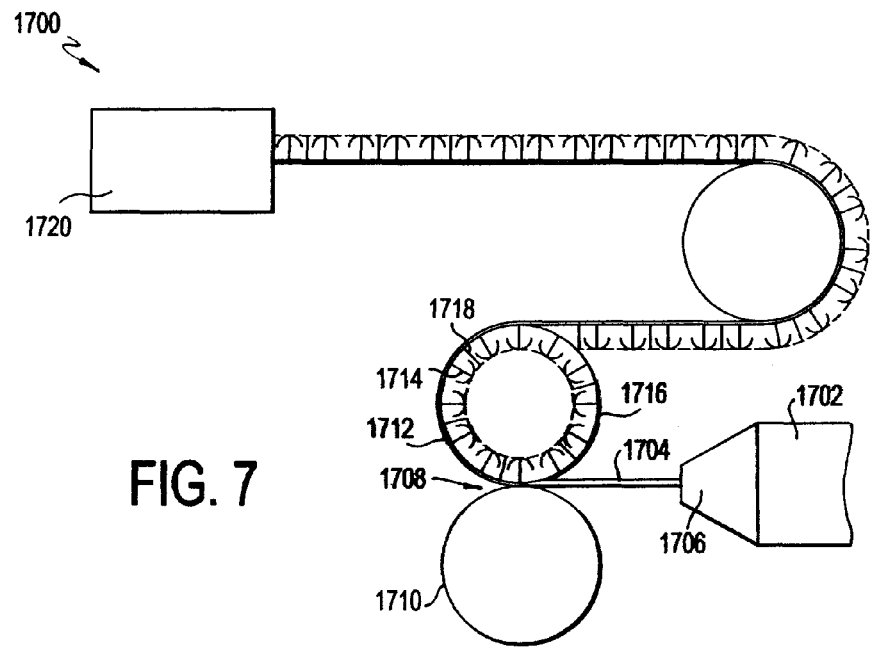
FIG. 7 is a side view of an apparatus for forming a fastening product, according to an embodiment of the present disclosure.

The fastener products disclosed herein can be formed as flexible, continuous strips or sheets of material in a continuous roll molding process. Referring to FIG. 7, manufacturing apparatus 1700 has an extruder barrel 1702 that melts and forces a molten resin 1704 through a die 1706 and into a nip 1708 between a pressure roller 1710 and a cavity roller 1712. Cavity roller 1712 has cavities 1714 defined about its perimeter 1716 that are shaped to form the fastener elements of the product, and other cavities 1718 that are configured to form the walls of the product (e.g., barriers walls, wave walls, lateral walls) and other product features (e.g., disrupters, hinges), as the base substrate is formed on the outer surface of the cavity roller. As will be appreciated, the wave shape of the wave walls can be defined by cavities 1718. In many cases, the outer surface of the cavity roller is formed by a stacked set of concentric, thin plates, as taught, for example, by Fischer in U.S. Pat. No. 4,775,310. Variations will be apparent. For instance, note that pressure roller 1710 is not necessary as cavity roller 1712 may alternatively be run against another surface. In some such cases, for example, the nip 1708 could be created between the cavity roller 1712 and a component of the extruder 1702, such as a surface of the die 1706, or an extended surface attached to die 1706.

Pressure in the nip forces the molten resin into the various cavities, leaving some resin remaining on the cavity roller surface. The resin travels around the cavity roller, which is chilled to promote resin solidification, and the solidified product is then stripped from the cavity roller by pulling the solidified fastener elements and walls and any other various features from their respective cavities. The fastener elements, walls and their respective cavities are illustrated schematically and are not to scale. In some example cases the cavity roller 1712 is of a diameter of between 30 and 50 centimeters, and the fastener elements and walls are less than 1.5 millimeter (~0.06 inches), to give a sense of perspective, according to one embodiment. After the continuous length of fastening material is formed, it moves through a die-cutting station 1720, where discrete fastener products are sequentially severed from the material. The remaining fastener material may be discarded or, in some cases, ground up and recycled to make further material.

Figure 8:
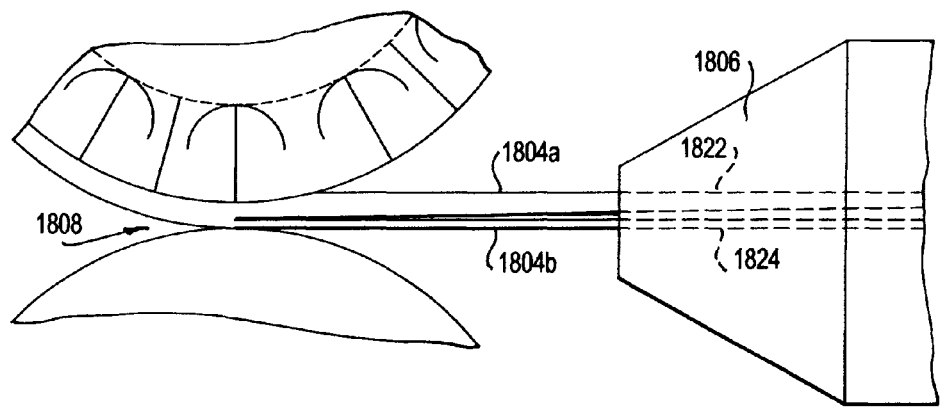
FIG. 8 is a side view of an apparatus for forming a fastening product as a coextrusion, according to an embodiment of the present disclosure.

Referring to FIG. 8, the apparatus and process of FIG. 7 may be modified to mold the fastening product from multiple resins, by extruding two molten resins together into the nip. In this example, a sufficient amount of a molten resin 1804a is extruded into nip 1808 to form the walls and fastener elements and any other upwardly extending features of the fastener product, while another flow of molten resin 1804b is introduced to the nip to form the base substrate of the product. The two resins are forced through a cross-head die head 1806 with two different die orifices 1822 and 1824, to join in the nip. A respective pool of each of the resins forms just upstream of the nip. In the nip, resin 1804a is forced into the cavity roller to form the fastener elements and the walls, while resin 1804b is calendered to form the substrate. The pressure in the nip also permanently laminates resin 1804a with resin 1804b to form the finished fastener product. In one example, resin 1804b is a magnetically attractable resin, while resin 1804a is a resin selected for wall and/or fastener element performance (or other upstanding product features, such as foam disrupters). In another example embodiment, the amount of each resin flow is modified such that the amount of resin 1804a is sufficient only to fill the head portions of the fastener element cavities and the inner extents of the wall-forming cavities, and is selected to have a lower durometer to provide the finished product with a softer feel and to enhance sealing of the upper wall surfaces against a foaming mold surface. In another example embodiment, the amount of each resin flow is adjusted such that resin 1804a fills the cavities and forms the upper surface of the substrate, with resin 1804b forming only the back portion of the substrate.

Figure 9A:
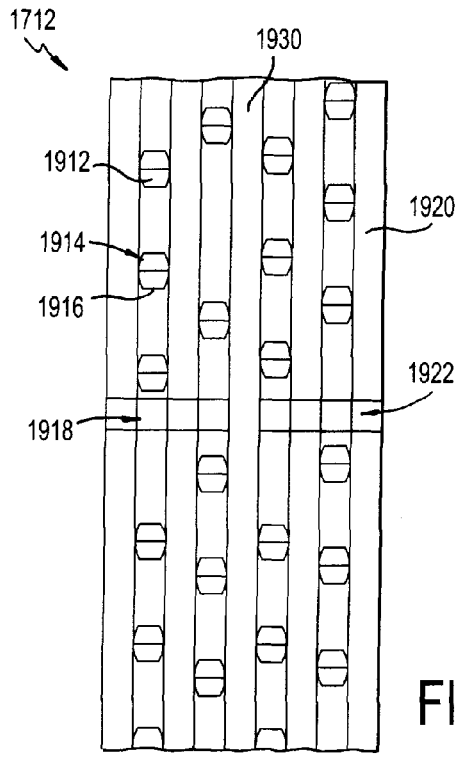
FIGS. 9A and 9B are top and side views, respectively, of an apparatus for forming a fastening product, according to an embodiment of the present disclosure.
Figure 9B:
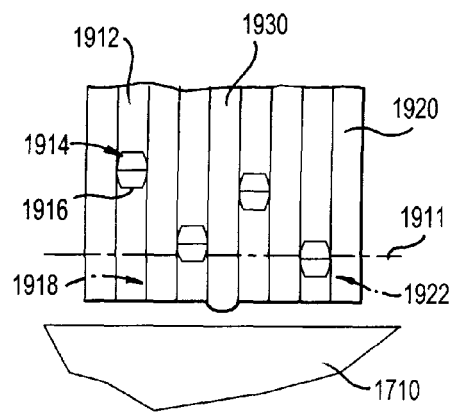

Referring to FIGS. 9A-9B, cavity roller 1712 includes multiple rings configured to form the fastener products disclosed herein. In this example, cavity roller 1712 includes multiple hook rings 1912 separated by spacer rings 1920. Each hook ring 1912 has cavities 1914 defined about its perimeter 1916 that are shaped to form the fastener elements of the fastener product, and other cavities 1918 that are configured to form portions of the lateral walls of the fastener product. To form lateral walls, the cavities 1918 of each hook ring 1912 and each spacer ring 1920 have a similar size (e.g., same width, length, and depth) and are aligned along the length of the roller. Dotted line 1911 shows the inner extent of the cavities 1918 and 1922. To form gaps extending through the lateral walls, gap rings 1930 can be inserted among the hook rings 1912 and spacer rings 1920. The gap rings 1930 are intentionally configured to include no cavities aligned with cavities 1918. When molten resin is forced into a nip between pressure roller 1710 (or other suitable surface) and cavity roller 1712, the molten resin forms the lateral walls in cavities 1918, but not in areas of the gap rings 1930, such that gaps are formed in the lateral walls. Different gap configurations can be achieved by configuring parameters of gap rings (e.g., number and thickness/shape of gap rings).

In some examples, hook rings 1912, spacer rings 1920 and gap rings 1930 have the same diameter, and the formed gaps extend from upper surface of the base substrate of the formed fastener products (e.g., the gap 126p of FIG. 1P). In some examples, the gap rings 1930 have a larger diameter than the hook rings 1912 and/or spacer rings 1920, and the formed gaps may extend into the base substrate (e.g., the gap 126s of FIG. 1S). In some examples, a middle gap ring has the same diameter as the hook rings 1912 and/or spacer rings 1920, and two side gap rings have a smaller diameter than the middle gap ring. The middle gap ring is sandwiched by the two side gap rings, such that the formed gaps have a stepped lateral width, e.g., the gap 126t of FIG. 1T. In still other examples, a V-shaped gap ring can be used, e.g., the gap 126u of FIG. 1U.

Figure 10A:
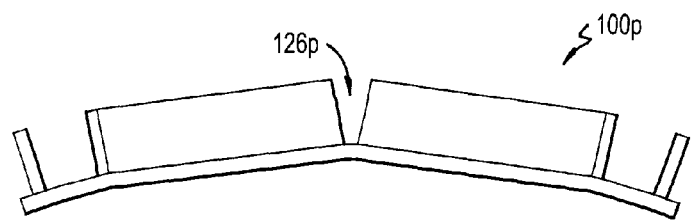
FIGS. 10A and 10B each depict a front view of a fastening product with different configurations for bending flexibility, according to an embodiment of the present disclosure.
Figure 10B:
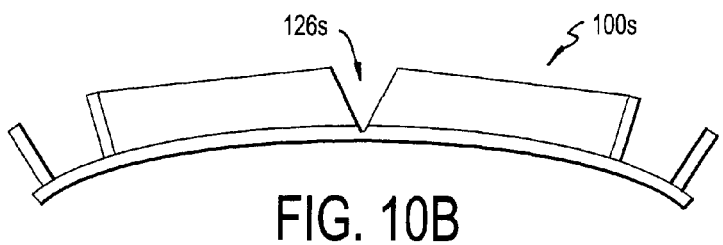

Referring to FIGS. 10A and 10B, fastener products with different configurations exhibit different bending flexibility. FIG. 10A shows the product 100p of FIG. 1P flexed or resiliently bent about an axis running along the length of the product. Due to gap 126p, the base of the product may be more readily flexed, opening gap 126p. FIG. 10B shows the product 100s of FIG. 1S similarly flexed. The longitudinal groove in the upper surface of the base substrate at gap 126s further decreases the resistance to bending, enabling even greater flexibility.

Figure 11:
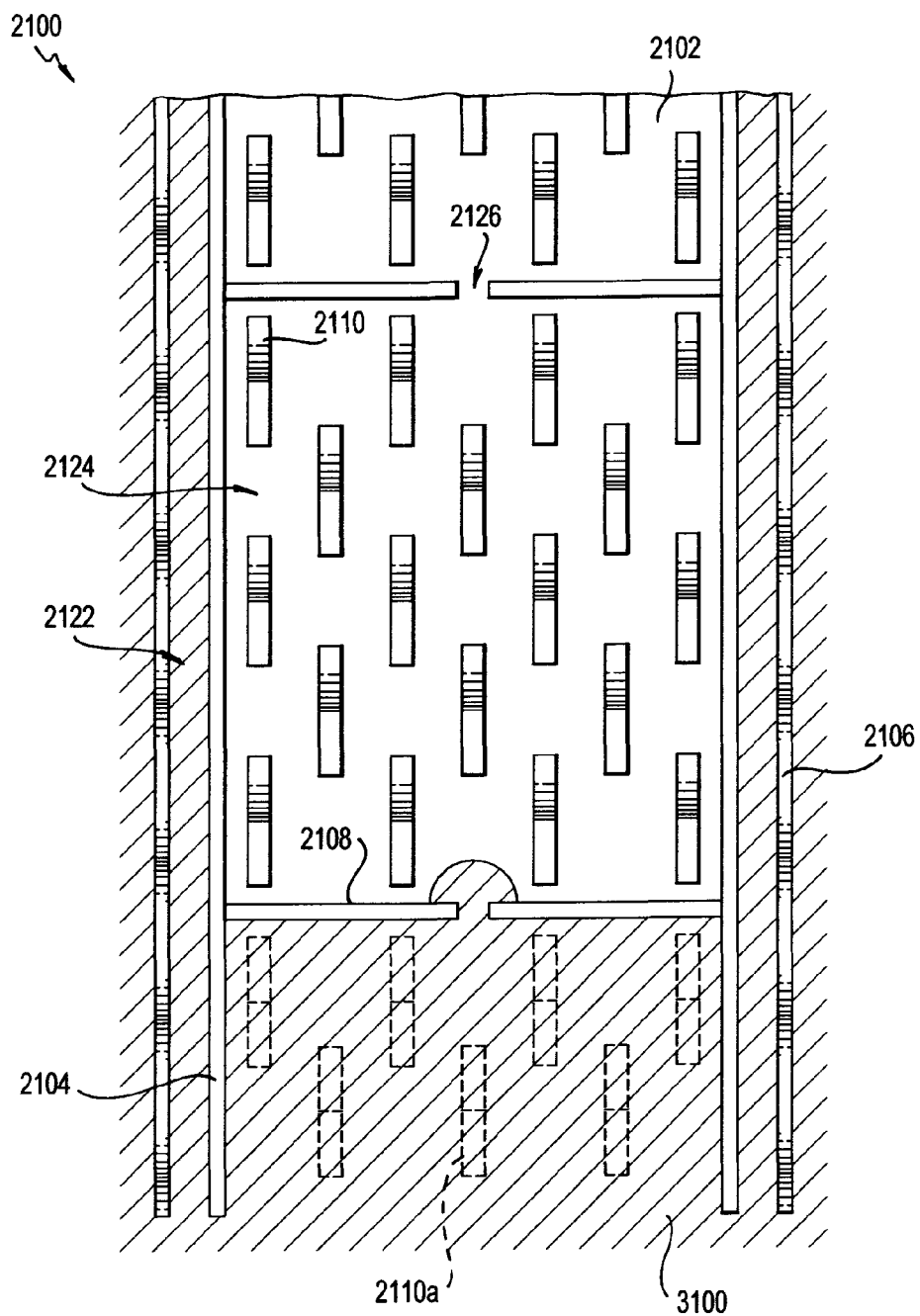
FIG. 11 is a top view of forming a molded foam article with a fastening product embedded in the article, according to an embodiment of the present disclosure.

Referring to FIG. 11, fastener product 2100 that includes gaps extending through lateral walls, is embedded in foam 3100 to form a molded foam article. As discussed herein, the fastener product can be placed on a flat surface of a mold pedestal that is disposed in the interior space of a mold cavity. The flowing foam 3100 is allowed to pass through wave walls 2106 of the fastening product and enter appropriately dimensioned foam relief spaces 2122. The walls bordering the fastening cells (e.g., longitudinal walls 2104 and lateral walls 2108) effectively seal the interior space housing the fastening elements 2110 against the flat pedestal surface. Accordingly, the flowing foam 3100 is inhibited from fouling an excessive number of the fastener elements 2110 in flow cells 2124.

In some examples, a continuous spool or strip of the fastener product can be severed so as to leave a partial, open cell at each end of the strip, the partial cells containing a number of fastening elements 2110a exposed to foam, as shown. In this example, the exposed fastening elements are embedded in the foam and act as additional anchor points to retain the ends of the cut product to the molded foam article. Further, the flowing foam 3100 may pass through the gaps 2126 defined in the lateral walls 2108 nearest the ends of the product and into the adjacent fastening cells 2124. With an appropriate gap configuration, as discussed herein (FIGS. 1P-U), gaps 2126 may be configured to allow only a relatively small amount of foam into the adjacent cell, such that the flowing foam is inhibited from contacting the fastener elements 2110, or limited to contacting only a few of the fastener elements, in the adjacent cell and is prevented from entering further fastener cells. Additionally, with the solidified foam so selectively infiltrated, those select gaps 2126 can act as additional anchor points to better hold the fastener product 2100 to the molded foam article.

Figure 12B:
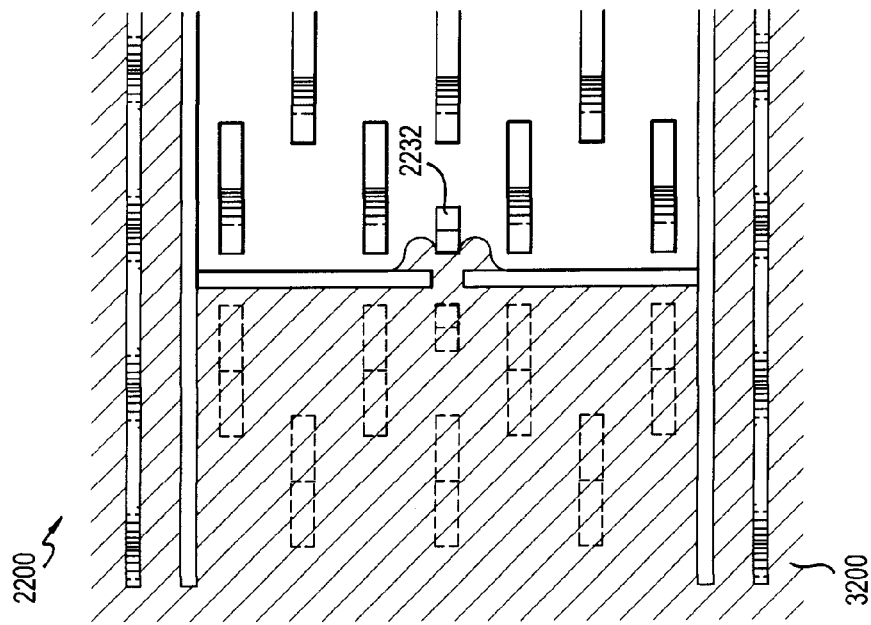
FIGS. 12A and 12B schematically and sequentially illustrate a process for forming a molded foam article with a fastening product embedded in the article, according to an embodiment of the present disclosure.
Figure 12A:
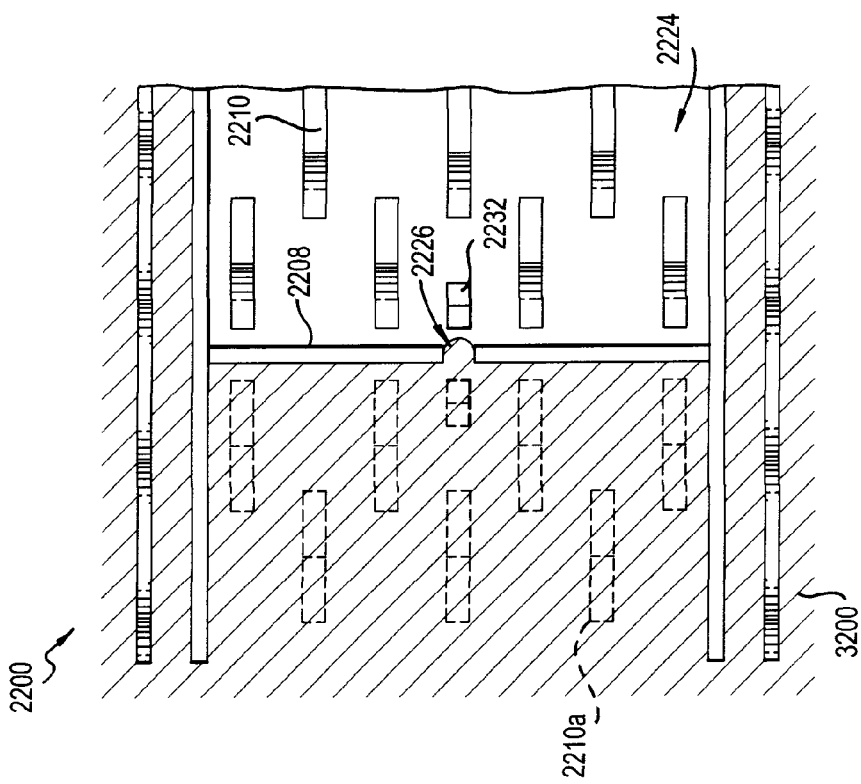

Referring to FIGS. 12A and 12B, fastener product 2200 is similar to fastener product 2100, except that fastener product 2200 includes foam disrupters 2232 adjacent gaps 2226 extending through lateral walls 2208. Flowing foam 3200 may immerse exposed fastener elements 2210a, and pass through gap 2226 and into adjacent fastener cell 2224. However, as discussed herein, foam disrupters 2232 can effectively disturb the structure and/or otherwise impeded the flow of the flowing foam. As shown in FIG. 12B, the flowing foam 3200 into the fastener cell 2224 is disturbed around the foam disrupter and inhibited from contacting the fastener elements 2210 in the fastener cell. With the solidified foam, the foam disrupters 2232 and the gaps 2226 can act as additional anchor points to better hold the fastener product 2200 to the molded foam article.

Alternative Wall Configurations

Figure 13A:
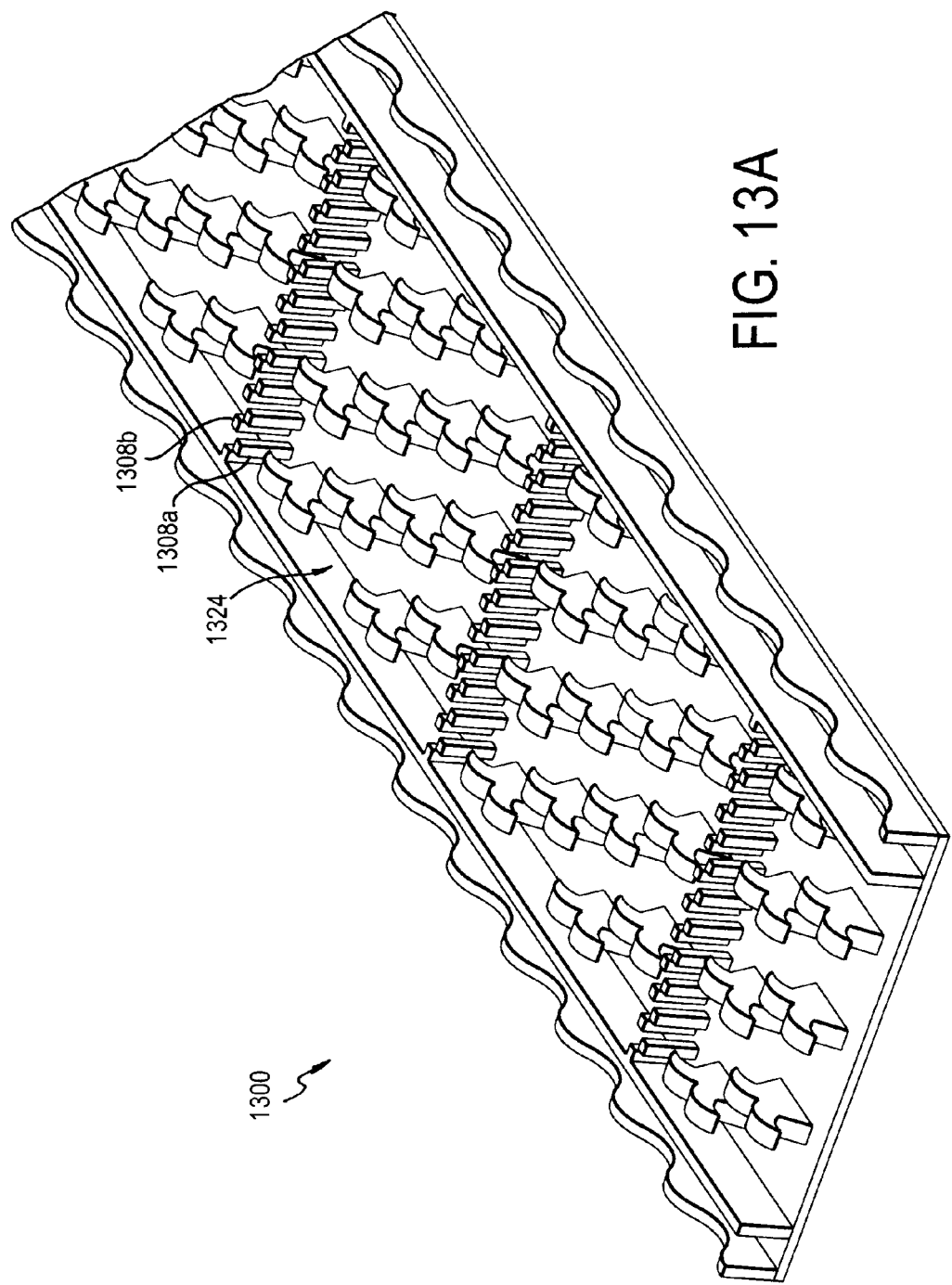
FIGS. 13A and 13B are a perspective and top view, respectively, of a fastener product with a pair of offset segmented lateral walls, according to an embodiment of the present disclosure.
Figure 13B:
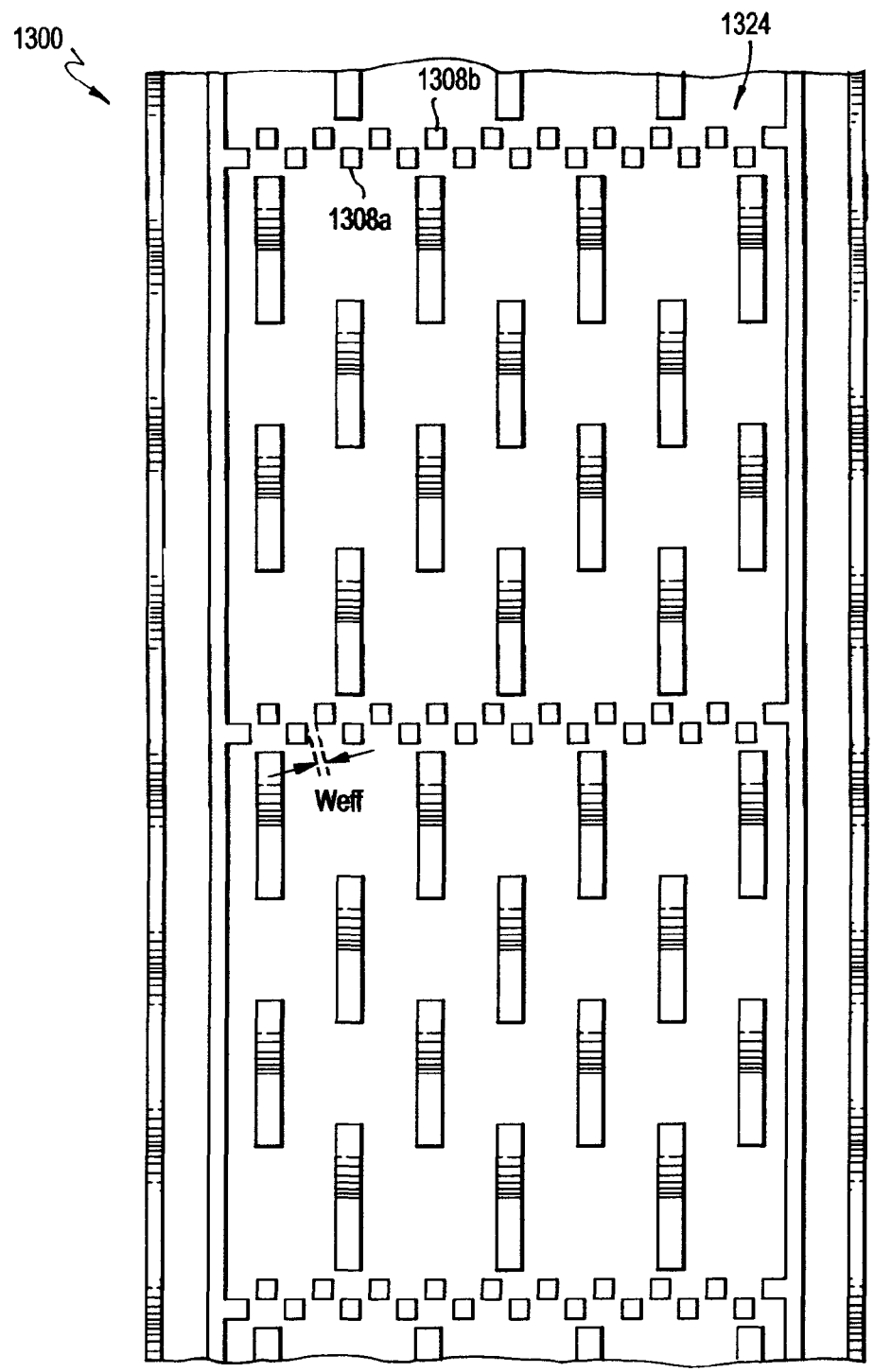

Referring next to FIGS. 13A and 13B, in some cases any of the examples provided herein may be modified to fastener product 1300 that provides a pair of adjacent segmented lateral walls 1308a and 1308 b between adjacent fastening cells 1324. In some cases, fastener product may include two or more segmented lateral walls between adjacent fastening cells. The lateral walls are laterally offset from one another, such that the segments of one wall are laterally aligned with the gaps of the other wall. This construction provides gaps connecting the adjacent cells, the gaps having an effective gap width $w_{\mathit{eff}}$ measured as the closest distance between opposed vertical edges of the segments of the lateral walls. In this manner, a series of gaps may be provided across the fastening width of the product, further enhancing lateral flexibility while preventing excessive foam intrusion between cells. In some examples, each segment of the lateral barrier walls has a longitudinal thickness of about 0.006 inches, a lateral width of between about 0.004 and 0.006 inches, and a height equal to the height of the longitudinal walls, or about 0.05 inches.

Figure 13C:
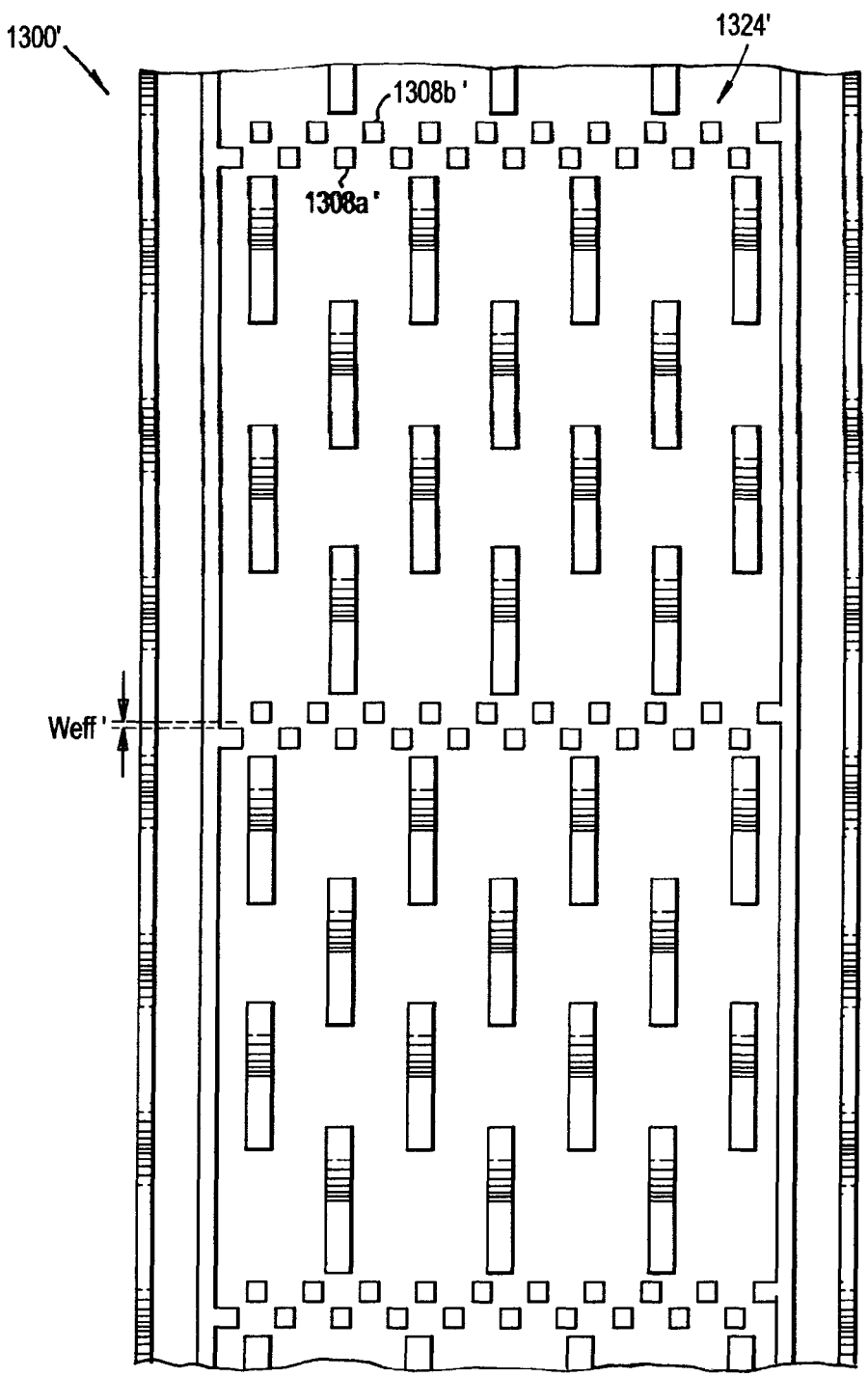
FIG. 13C is a top view of a modified fastener product, according to another embodiment of the present disclosure.

In some cases, as shown in FIG. 13B, the effective gaps between the adjacent segments of the lateral barrier walls may have a width of about 0.001 inches. FIG. 13C shows a modified fastener product 1300', where the adjacent segments of the lateral barrier walls have a longitudinal gap width of about 0.002 inches and a lateral gap width of about zero. In other words, the edges of the segments of one lateral barrier wall are laterally aligned with those of the other lateral barrier wall. Preferably the effective gap width is less than or equal to about 0.003 inches (more preferably, less than about 0.0015 inches). The effective gap width may be selected so as to allow the flowing foam to at least partially imbed the segments within the stabilized foam, while slowing down the foam flow so as to prevent excessive intrusion into the next fastening cell. Furthermore, the large number of gaps along the transverse walls allows for increased flexibility at several points along the width of the product, for accommodating various curves. It will be understood that the lateral barrier wall segments may be configured to be laterally aligned with the fastener elements, such that some of the segments are formed within the width of molding rings that form respective rows of fastener elements, while other lateral barrier wall segments are formed within other rings. Lateral barrier wall segments may be formed by aligned grooves in adjacent rings, or even by a set of rings that is permanently laminated for durability.

FIGS. 14A-F show alternate example wave wall configurations that can be used with any of the embodiments provided herein. Numerous other wave wall shapes that present a gradual rising and/or falling edge to encroaching foam can be used to provide similar benefits as previously discussed with respect to a sine wave shape, and as will be apparent in light of this disclosure.

Figure 14A:
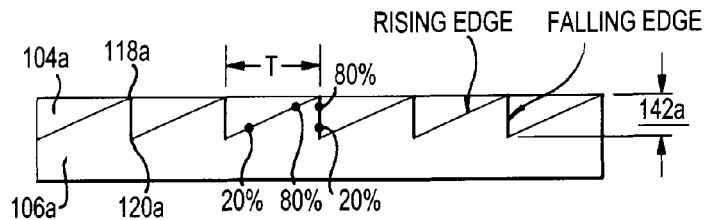
FIGS. 14A-14F each depicts a side view of a fastening product configured with an example wave shape, according to an embodiment of the present disclosure.

FIG. 14A shows a wave wall 106a having a saw tooth wave shape so as to provide a gradual rising edge in conjunction and an abrupt falling edge, according to an embodiment. In this example, the peaks 118a of the wave wall 106a have the same height as the barrier wall 104a, and the troughs 120a dip to a distance 142a from the top of the barrier wall 104a. One period T of this example pattern includes a gradual rising edge and one abrupt falling edge, which cyclically repeats down the length of the fastening product. Previously provided example dimensions with respect the wave period and various heights and slope equally apply here. Here, the 20% and 80% points of the rising edge are shown. While the slope of the abrupt falling edge is substantially vertical (e.g., 85 to 95 degrees), the slope of the rising edge is gradual and is in the range of 3 to 65 degrees in some embodiments. For instance, the slope of a straight line connecting the 20% and 80% points of the rising edge is in the range of about 4 degrees to about 50 degrees, or about 6 degrees to about 18 degrees. In a more general sense, the slope of the rising edge allows for an encroachment pattern of foam into the foam relief space that is distinct from the encroachment pattern of foam into the foam relief space that would be allowed by openings having rising and falling edges that are both abrupt. It is believed that the encroachment pattern provided by a gradually sloped wave wall pattern provides a better anchoring of the fastening product with the foam cushion, and therefore provides a better bond strength. Note in other embodiments, the rising edge slope could be abrupt and the falling edge could be gradually sloped.

Figure 14B:
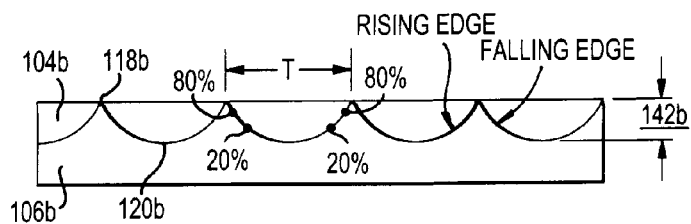

FIG. 14B shows a wave wall 106b having another wave shape that is similar to a triangle wave (FIG. 1F) but has curved edges rather than straight, so as to provide gradual rising and falling edges, according to another embodiment of the present disclosure. In this example, the peaks 118b of the wave wall 106b have the same height as the barrier wall 104b, and the troughs 120b dip to a distance 142b from the top of the barrier wall 104b. The period T as well as the 20% and 80% points are shown, and the various previous relevant discussions are equally applicable here. The slope of the rising and falling edges can be computed by determining the slope of a straight line connection the 20% and 80% points of a given edge, and that slope may be in the range of about 4 degrees to about 50 degrees, or about 6 degrees to about 18 degrees.

Figure 14C:
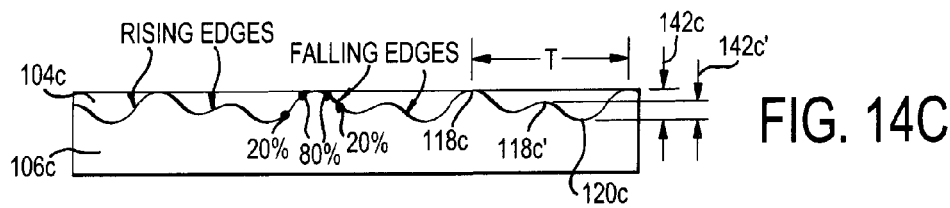

FIG. 14C shows a wave wall 106c having a bi-modal sine wave shape as to provide gradual rising and falling edges, according to another embodiment. In this example, the peaks 118c of the wave wall 106c have the same height as the barrier wall 104c, and the troughs 120c dip to a distance 142c from the top of the barrier wall 104c. In addition, a second set of peaks 118c' are effectively interleaved between peaks 118c, and are a distance 142c' from the lowest point of the trough 120c. Such a wave pattern combines wave pattern features of FIGS. 1B and 4B, and may provide a better foam encroachment pattern in the foam relief spaces. The period T as well as the 20% and 80% points are shown, and the various previous relevant discussions are equally applicable here. Note that the 20/80 slope of any edge included in the wave shape can be taken, whether it be with respect to the main sine wave edges or the secondary intervening sine wave edges.

Figure 14D:
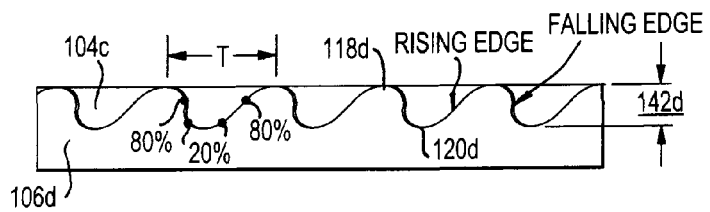

FIG. 14D shows a wave wall 106d having another wave shape that is similar to a sine wave (FIG. 1B or 4B) but is slanted or tilted to one side, so as to provide a rising edge in conjunction and a relatively more abrupt falling edge, according to another embodiment. In this example, the peaks 118d of the wave wall 106d have the same height as the barrier wall 104d, and the troughs 120d dip to a distance 142d from the top of the barrier wall 104d. The period T as well as the 20% and 80% points are shown, and the various previous relevant discussions are equally applicable here. Alternatively, the rising edge slope could be abrupt and the falling edge could be gradually sloped.

Figure 14E:
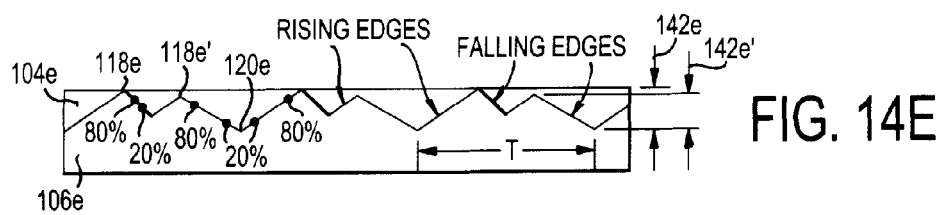

FIG. 14E shows a wave wall 106e having a bi-modal triangle wave shape so as to provide gradual rising and falling edges, according to another embodiment. In this example, the peaks 118e of the wave wall 106e have the same height as the barrier wall 104e, and the troughs 120e dip to a distance 142e from the top of the barrier wall 104e. In addition, a second set of peaks 118e' are effectively interleaved between peaks 118e, and are a distance 142e' from the lowest point of the trough 120e. Such a wave pattern combines wave pattern features of FIGS. 1B and 4B, and may provide a better foam encroachment pattern in the foam relief spaces. The period T as well as the 20% and 80% points are shown, and the various previous relevant discussions are equally applicable here. Like the bimodal sine wave shape, note that the 20/80 slope of any edge included in the wave shape can be taken, whether it be with respect to the main triangle wave edges or the secondary intervening triangle wave edges.

Figure 14F:
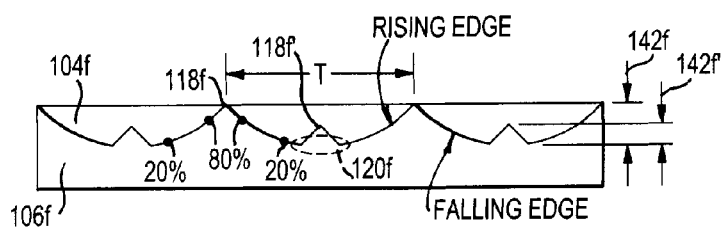

FIG. 14F shows a wave wall 106f having another bi-modal wave shape so as to provide gradual rising and falling edges, according to another embodiment. In this example, the peaks 118f of the wave wall 106f have the same height as the barrier wall 104f, and the troughs 120f effectively dip to a distance 142f from the top of the barrier wall 104f. In addition, a second set of peaks 118f' are effectively interleaved between peaks 118f, and are a distance 142f' from the lowest point of the trough 120f. Such a wave pattern combines wave pattern features of FIGS. 1B and 4B, and may provide a better foam encroachment pattern in the foam relief spaces. The period T as well as the 20% and 80% points are shown, and the various previous relevant discussions are equally applicable here. Like the bimodal sine and triangle wave shapes, note that the 20/80 slope of any edge included in the wave shape can be taken, whether it be with respect to the main curved wave edges or the secondary intervening triangle-like wave edges. In an alternative embodiment, the intervening triangle-like wave shape can have abrupt rising and falling edges, so that the gradual slope of the main curved edges would be used to provide the tapered flow gap.

Numerous variations will be apparent. For instance, in any of these examples the peaks may be shorter than the barrier wall, as discussed with reference to FIGS. 4A-B. Also, other embodiments may have a period T that varies down the length of the product. For instance, in one such example case, the period at the ends of a given strip of fastening product where the cells are exposed can be longer than the period in the middle portion of the strip. Thus, the flow gap may vary accordingly (more inward flow of foam at ends of product strip than in the middle of the product strip. In some such cases, the product strip may have a bi-modal wave pattern for the middle cells and another wave pattern at the ends of the strip, or some other combination of wave patterns.

Figure 15A:
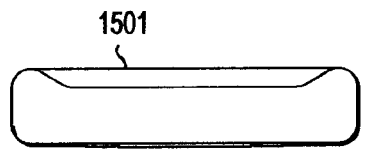
FIGS. 15A-15D each depicts a side or front view of a molded foam seat cushion with a fastening product, according to an embodiment of the present disclosure.
Figure 15B:
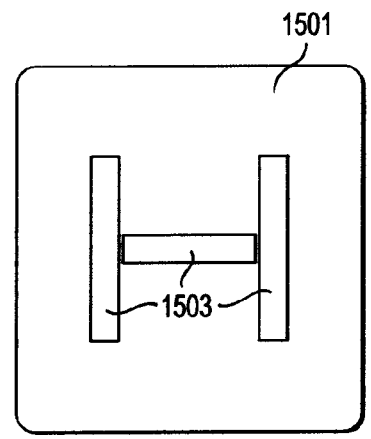
Figure 15C:
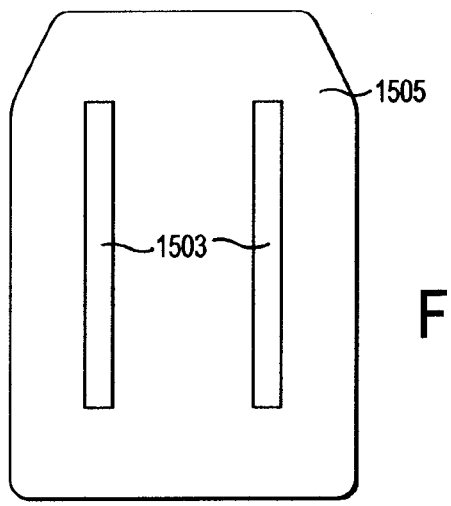
Figure 15D:
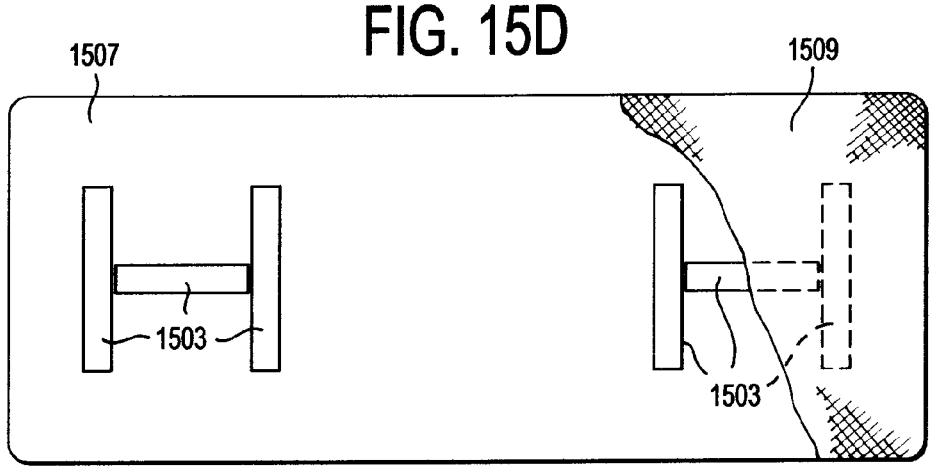

FIGS. 15A-15D each depicts a side or front view of a molded foam seat cushion with a fastening product, according to an embodiment of the present disclosure. FIG. 15A shows a side view of a bottom seat cushion 1501, and FIG. 15B shows a top view of that cushion (bucket seat type cushion). As can be seen, several fastening products 1503 are embedded or otherwise anchored in the foam cushion 1501. In one such example configuration, the vertical-going strips are about 10 inches long and about 0.5 inches wide, and the horizontal-going strip in between is about 7 inches long and 0.5 inches wide. A seat covering can be fit over the cushion 1501, such that loop or other mating elements embedded with or otherwise native to the covering can engage the fastener elements of the fastening products 1503 to secure that covering to the cushion 1501. FIG. 15C shows a front view of an example back support cushion 1505 having two vertical-going fastening products 1503 that are about 14 inches long and about 0.5 inches wide, and which can be covered in a similar fashion. FIG. 15D shows another example seat cushion 1507 (top view of bench-like seat cushion) have two different grouping of fastening products 1503 each similar to the grouping shown in FIG. 15B. Also shown is a cut-away portion of an example covering 1509 that can be fitted out the cushion 1507 and secured to the fastening products 1503.

Further Example Embodiments

Example 1 is a touch fastener strip. The strip includes a base having a pair of opposing longitudinal edges and a pair of opposing lateral edges, a pair of longitudinal barrier walls each extending upward from a surface of the base and inboard a corresponding one of the longitudinal edges of the base a plurality of lateral barrier walls each extending upward from the surface of the base and extending between facing surfaces of the barrier walls, thereby defining one or more fastening cells, and one or more touch fastener elements extending upward from the surface of the base in each of the one or more fastening cells. The strip further includes a pair of wave walls each extending upward from the surface of the base and outboard a corresponding one of the barrier walls thereby defining a foam relief space between each wave wall and corresponding barrier wall, wherein each wave wall has a wave shape configured with rising and falling edges, at least one of the rising and falling edges having a slope as measured on a straight line connecting 20% and 80% points of the edge, the slope being in the range of 3° to 65°. In one example such case, the strip is about 0.5 to 0.9 inches wide and about 5.0 to 15.0 inches long. In another example such case, the strip is about 1.0 to 3.0 inches wide and about 15.0 to 25.0 inches long. In a more general sense, any dimensions can be used that are suitable to a given application.

Example 2 includes the subject matter of Example 1, wherein each of the base, longitudinal walls, lateral walls, touch fastener elements, and wave walls form a unitary mass of material, such as a moldable plastic or resin.

Example 3 includes the subject matter of Example 1 or 2, wherein the longitudinal barrier walls are segmented. Gaps between the segments may be sized to allow a relatively minor in-flow of foam into edge area the fastening cells (e.g., so that foam may be 0.01 to 0.1 inches into cells).

Example 4 includes the subject matter of any of the previous Examples, wherein each lateral barrier wall defines at least one gap connecting adjacent fastening cells, the touch fastener strip further comprising a foam disrupter extending upward from the surface of the base within the fastening cells adjacent a corresponding one of the at least one gap.

Example 5 includes the subject matter of any of the previous Examples, wherein the at least one gap has a tapered width.

Example 6 includes the subject matter of any of the previous Examples, the touch fastener strip further including a plurality of foam disrupters each extending into one of the foam relief spaces from at least one of the corresponding wave wall and barrier wall, so as to provide anchor points.

Example 7 includes the subject matter of any of the previous Examples, wherein the wave shape has a duty cycle in the range of 40% to 60% and the slope is in the range of range of 6° to 20°, or 6° to 18°.

Example 8 includes the subject matter of any of the previous Examples, wherein the wave shape comprises a sine wave. The sine wave may be titled in some such cases, so as to provide one rising or falling edges that is more gradual than the other of the rising or falling edges.

Example 9 includes the subject matter of any of the previous Examples, wherein the wave shape comprises at least one of a triangle wave and a ramp wave.

Example 10 includes the subject matter of any of the previous Examples, wherein the wave shape comprises a bi-modal wave having two different peak points in a given cycle of the shape.

Example 11 includes the subject matter of Example 10, wherein a first of the two peak points has a height that is the same as a height of the longitudinal barrier wall, and a second of the two peaks has a shorter height that is the between the height of the longitudinal barrier wall and a third of the height of the longitudinal barrier wall.

Example 12 includes the subject matter of any of the previous Examples, wherein the wave shape comprises a peak-to-peak amplitude and the wave wall has an overall height, and the ratio of the peak-to-peak amplitude and the overall height is in the range of range 5% to 40%.

Example 13 includes the subject matter of any of the previous Examples, wherein a missing portion of the wave wall attributable to the wave shape has a first area that is part of an overall area of the wave wall had the wave wall been a whole rectangle shape rather than wave shaped, and the first area is in the range of about 4 to 45 percent of the overall area.

Example 14 includes the subject matter of any of the previous Examples, wherein the slope is in the range of 4° to 50°.

Example 15 includes the subject matter of any of the previous Examples, wherein the slope is in the range of 5° to 30°.

Example 16 is a foam cushion product comprising the touch fastener of any of the previous Examples.

Example 17 is a vehicle seat comprising the foam cushion product of Example 16.

Example 18 is a mold-in touch fastener strip. The strip includes a base having a pair of opposing longitudinal edges and a pair of opposing lateral edges, a pair of longitudinal barrier walls each extending upward from a surface of the base and inboard a corresponding one of the longitudinal edges of the base, and a plurality of lateral barrier walls each extending upward from the surface of the base and extending between facing surfaces of the barrier walls, thereby defining one or more fastening cells. One or more touch fastener elements are extending upward from the surface of the base in each of the one or more fastening cells. A pair of wave walls each extending upward from the surface of the base and outboard a corresponding one of the barrier walls thereby defining a foam relief space between each wave wall and corresponding barrier wall, wherein each wave wall has a sine wave shape configured with rising and falling edges, the rising and falling edges having a slope as measured on a straight line connecting 20% and 80% points of the edge, the slope being in the range of 5° to 30°. Each of the base, longitudinal walls, lateral walls, touch fastener elements, and wave walls form a unitary mass of resin.

Example 19 includes the subject matter of Example 18, wherein the sine wave shape has a duty cycle in the range of 45% to 55%, the slope is in the range of range of 6° to 18°, and a missing portion of the wave wall attributable to the wave shape has a first area that is part of an overall area of the wave wall had the wave wall been a whole rectangle shape rather than wave shaped, and the first area is in the range of about 4 to 45 percent of the overall area. Numerous variations will be apparent in light of this disclosure.

Example 20 is a method of making a touch fastener strip, such as those provide in any of the previous Examples. In some cases, the method includes providing a base having a pair of opposing longitudinal edges and a pair of opposing lateral edges, providing a pair of longitudinal barrier walls each extending upward from a surface of the base and inboard a corresponding one of the longitudinal edges of the base, and providing a plurality of lateral barrier walls each extending upward from the surface of the base and extending between facing surfaces of the barrier walls, thereby defining one or more fastening cells. The method further includes providing one or more touch fastener elements extending upward from the surface of the base in each of the one or more fastening cells. The method further includes providing a pair of wave walls each extending upward from the surface of the base and outboard a corresponding one of the barrier walls thereby defining a foam relief space between each wave wall and corresponding barrier wall, wherein each wave wall has a wave shape configured with rising and falling edges, at least one of the rising and falling edges having a slope as measured on a straight line connecting 20% and 80% points of the edge, the slope being in the range of 3° to 65°. Each of the base, longitudinal walls, lateral walls, touch fastener elements, and wave walls form a unitary mass of resin.

Example 21 includes the subject matter of Example 20, wherein the wave shape comprises at least one of a sine wave, a triangle wave, a ramp wave, and a bi-modal wave having two different peak points in a given cycle of the shape.

Example 22 is a method of making a molded product. The method includes abutting a touch fastener strip to a surface of a mold cavity, and introducing flowable material into the mold cavity, wherein abutting the touch fastener strip to the surface of a mold cavity provides one or more intentional openings that allow an amount of the flowable material to flow into relief spaces of the touch fastener strip, so that the fastening product becomes anchored to the molded product being formed. The touch fastener strip may be configured, as in any of the previous Examples. In some cases, the touch fastener strip includes a base having a pair of opposing longitudinal edges and a pair of opposing lateral edges, a pair of longitudinal barrier walls each extending upward from a surface of the base and inboard a corresponding one of the longitudinal edges of the base, and a plurality of lateral barrier walls each extending upward from the surface of the base and extending between facing surfaces of the barrier walls, thereby defining one or more fastening cells. One or more touch fastener elements are extending upward from the surface of the base in each of the one or more fastening cells. The touch fastener strip further includes a pair of wave walls each extending upward from the surface of the base and outboard a corresponding one of the barrier walls thereby defining a relief space between each wave wall and corresponding barrier wall, wherein each wave wall has a wave shape configured with rising and falling edges, at least one of the rising and falling edges having a slope as measured on a straight line connecting 20% and 80% points of the edge, the slope being in the range of 3° to 65°.

Example 23 includes the subject matter of Example 22, wherein the flowable material is liquefied foam that cures to form a foam product.

Example 24 includes the subject matter of Example 22 or 23, wherein the molded product is at least part of a vehicle seat.

Example 25 includes the subject matter of any of Examples 22-24, wherein each lateral barrier wall defines at least one gap connecting adjacent fastening cells, the touch fastener strip further comprising a flowable material disrupter extending upward from the surface of the base within the fastening cells adjacent a corresponding one of the at least one gap. The flowable material may be, for example, liquefied foam or resin or any other flowable material that can be used to form a molded product, and that can be cured or otherwise sets to a relatively rigid or non-flowing state.

Example 26 includes the subject matter of any of Examples 22-25, wherein the touch fastener strip further includes a plurality of flowable material disrupters each extending into one of the relief spaces from at least one of the corresponding wave wall and barrier wall, so as to provide anchor points when the flowable material sets.

Example 27 includes the subject matter of any of Examples 22-26, wherein the wave shape has a duty cycle in the range of 40% to 60% and the slope is in the range of range of 6° to 20°.

Example 28 includes the subject matter of any of Examples 22-27, wherein the wave shape comprises a sine wave.

Example 29 includes the subject matter of any of Examples 22-28, wherein the wave shape comprises at least one of a triangle wave and a ramp wave.

Example 30 includes the subject matter of any of Examples 22-29, wherein the wave shape comprises a bi-modal wave having two different peak points in a given cycle of the shape. In some such cases, a first of the two peak points has a height that is the same as a height of the longitudinal barrier wall, and a second of the two peaks has a shorter height that is the between the height of the longitudinal barrier wall and a third of the height of the longitudinal barrier wall.

Example 31 includes the subject matter of any of Examples 22-30, wherein the wave shape comprises a peak-to-peak amplitude and the wave wall has an overall height, and the ratio of the peak-to-peak amplitude and the overall height is in the range of range 5% to 40%.

Example 32 includes the subject matter of any of Examples 22-31, wherein a missing portion of the wave wall attributable to the wave shape has a first area that is part of an overall area of the wave wall had the wave wall been a whole rectangle shape rather than wave shaped, and the first area is in the range of about 4 to 45 percent of the overall area.

Example 33 includes the subject matter of any of Examples 22-32, wherein the slope is in the range of 4° to 50°.

Example 34 includes the subject matter of any of Examples 22-33, wherein the slope is in the range of 5° to 30°.

Example 35 includes the subject matter of any of Examples 22-34, wherein the slope is in the range of 6° to 18°.

It will be seen by those skilled in the art that many embodiments taking a variety of specific forms and reflecting changes, substitutions, and alternations can be made without departing from the spirit and scope of the present disclosure. Therefore, the described embodiments illustrate but do not restrict the scope of the claims.

What is claimed is:

1. A touch fastener strip comprising:
a base having a pair of opposing longitudinal edges and a pair of opposing lateral edges;
a pair of longitudinal barrier walls each extending upward from a surface of the base and inboard a corresponding one of the longitudinal edges of the base;
a plurality of lateral barrier walls each extending upward from the surface of the base and extending between facing surfaces of the barrier walls, thereby defining one or more fastening cells;
one or more touch fastener elements extending upward from the surface of the base in each of the one or more fastening cells; and
a pair of wave walls each extending upward from the surface of the base and outboard a corresponding one of the barrier walls thereby defining a foam relief space between each wave wall and corresponding barrier wall, wherein each wave wall has a wave shape configured with rising and falling edges, at least one of the rising and falling edges having a slope as measured on a straight line connecting 20% and 80% points of the edge, the slope being in the range of 3° to 65°.

2. The touch fastener strip of claim 1, wherein each of the base, longitudinal walls, lateral walls, touch fastener elements, and wave walls form a unitary mass of material.

3. The touch fastener strip of claim 1, wherein the longitudinal barrier walls are segmented.

4. The touch fastener strip of claim 1, wherein each lateral barrier wall defines at least one gap connecting adjacent fastening cells, the touch fastener strip further comprising a foam disrupter extending upward from the surface of the base within the fastening cells adjacent a corresponding one of the at least one gap.

5. The touch fastener strip of claim 4, wherein the at least one gap has a tapered width.

6. The touch fastener strip of claim 1, further comprising a plurality of foam disrupters each extending into one of the foam relief spaces from at least one of the corresponding wave wall and barrier wall, so as to provide anchor points.

7. The touch fastener of claim 1, wherein the wave shape has a duty cycle in the range of 40% to 60% and the slope is in the range of range of 6° to 20°.

8. The touch fastener of claim 1, wherein the wave shape comprises a sine wave.

9. The touch fastener of claim 1, wherein the wave shape comprises at least one of a triangle wave and a ramp wave.

10. The touch fastener of claim 1, wherein the wave shape comprises a bi-modal wave having two different peak points in a given cycle of the shape.

11. The touch fastener of claim 10, wherein a first of the two peak points has a height that is the same as a height of the longitudinal barrier wall, and a second of the two peaks has a shorter height that is the between the height of the longitudinal barrier wall and a third of the height of the longitudinal barrier wall.

12. The touch fastener of claim 1, wherein the wave shape comprises a peak-to-peak amplitude and the wave wall has an overall height, and the ratio of the peak-to-peak amplitude and the overall height is in the range of range 5% to 40%.

13. The touch fastener of claim 1, wherein a missing portion of the wave wall attributable to the wave shape has a first area that is part of an overall area of the wave wall had the wave wall been a whole rectangle shape rather than wave shaped, and the first area is in the range of about 4 to 45 percent of the overall area.

14. The touch fastener of claim 1, wherein the slope is in the range of 4° to 50°.

15. The touch fastener of claim 1, wherein the slope is in the range of 5° to 30°.

16. A foam cushion product comprising the touch fastener of claim 1.

17. A mold-in touch fastener strip comprising:
- a base having a pair of opposing longitudinal edges and a pair of opposing lateral edges;
- a pair of longitudinal barrier walls each extending upward from a surface of the base and inboard a corresponding one of the longitudinal edges of the base;
- a plurality of lateral barrier walls each extending upward from the surface of the base and extending between facing surfaces of the barrier walls, thereby defining one or more fastening cells;
- one or more touch fastener elements extending upward from the surface of the base in each of the one or more fastening cells; and
- a pair of wave walls each extending upward from the surface of the base and outboard a corresponding one of the barrier walls thereby defining a foam relief space between each wave wall and corresponding barrier wall, wherein each wave wall has a sine wave shape configured with rising and falling edges, the rising and falling edges having a slope as measured on a straight line connecting 20% and 80% points of the edge, the slope being in the range of 5° to 30°;
- wherein each of the base, longitudinal walls, lateral walls, touch fastener elements, and wave walls form a unitary mass of resin.

18. The touch fastener of claim 17, wherein:
the sine wave shape has a duty cycle in the range of 45% to 55%;
the slope is in the range of range of 6° to 18°; and
a missing portion of the wave wall attributable to the wave shape has a first area that is part of an overall area of the wave wall had the wave wall been a whole rectangle shape rather than wave shaped, and the first area is in the range of about 4 to 45 percent of the overall area.

19. A method of making a molded product, comprising:
abutting a touch fastener strip to a surface of a mold cavity, the touch fastener strip including:
- a base having a pair of opposing longitudinal edges and a pair of opposing lateral edges;
- a pair of longitudinal barrier walls each extending upward from a surface of the base and inboard a corresponding one of the longitudinal edges of the base;
- a plurality of lateral barrier walls each extending upward from the surface of the base and extending between facing surfaces of the barrier walls, thereby defining one or more fastening cells;
- one or more touch fastener elements extending upward from the surface of the base in each of the one or more fastening cells; and
- a pair of wave walls each extending upward from the surface of the base and outboard a corresponding one of the barrier walls thereby defining a relief space between each wave wall and corresponding barrier wall, wherein each wave wall has a wave shape configured with rising and falling edges, at least one of the rising and falling edges having a slope as measured on a straight line connecting 20% and 80% points of the edge, the slope being in the range of 3° to 65°; and introducing flowable material into the mold cavity;
wherein abutting the touch fastener strip to the surface of a mold cavity provides one or more intentional openings that allow an amount of the flowable material to flow into the relief spaces, so that the fastening product becomes anchored to the molded product being formed.

20. The method of claim 19, wherein the flowable material is liquefied foam that cures to form a foam product.

21. The method of claim 19, wherein the molded product is at least part of a vehicle seat.

22. The method of claim 19, wherein each lateral barrier wall defines at least one gap connecting adjacent fastening cells, the touch fastener strip further comprising a flowable material disrupter extending upward from the surface of the base within the fastening cells adjacent a corresponding one of the at least one gap.

23. The method of claim 19, wherein the touch fastener strip further includes a plurality of flowable material disrupters each extending into one of the relief spaces from at least one of the corresponding wave wall and barrier wall, so as to provide anchor points when the flowable material sets.

24. The method of claim 19, wherein the wave shape has a duty cycle in the range of 40% to 60% and the slope is in the range of range of 6° to 20°.

25. The method of claim 19, wherein the wave shape comprises a sine wave.

26. The method of claim 19, wherein the wave shape comprises at least one of a triangle wave and a ramp wave.

27. The method of claim 19, wherein the wave shape comprises a peak-to-peak amplitude and the wave wall has an overall height, and the ratio of the peak-to-peak amplitude and the overall height is in the range of range 5% to 40%.

28. The method of claim 19, wherein a missing portion of the wave wall attributable to the wave shape has a first area that is part of an overall area of the wave wall had the wave wall been a whole rectangle shape rather than wave shaped, and the first area is in the range of about 4 to 45 percent of the overall area.

29. The method of claim 19, wherein the slope is in the range of 4° to 50°.

30. The method of claim 19, wherein the slope is in the range of 6° to 18°.

* * * * *